US008526102B2

(12) United States Patent
Inoue et al.

(10) Patent No.: US 8,526,102 B2
(45) Date of Patent: Sep. 3, 2013

(54) PLC-TYPE DEMODULATOR AND OPTICAL TRANSMISSION SYSTEM

(75) Inventors: Takashi Inoue, Tokyo (JP); Kazutaka Nara, Tokyo (JP)

(73) Assignee: Furukawa Electronic Co., Ltd., Tokyo (JP)

( * ) Notice: Subject to any disclaimer, the term of this patent is extended or adjusted under 35 U.S.C. 154(b) by 0 days.

(21) Appl. No.: 13/409,343

(22) Filed: Mar. 1, 2012

(65) Prior Publication Data

US 2012/0207474 A1 Aug. 16, 2012

Related U.S. Application Data

(63) Continuation of application No. PCT/JP2010/065313, filed on Sep. 7, 2010.

(30) Foreign Application Priority Data

Sep. 7, 2009 (JP) ................................ 2009-206115

(51) Int. Cl.
*G02B 6/26* (2006.01)
*G02B 6/42* (2006.01)
*H04J 14/06* (2006.01)

(52) U.S. Cl.
USPC .................. 359/325; 398/65; 385/14; 385/45

(58) Field of Classification Search
USPC .................. 359/325; 385/14, 42, 45; 398/65
See application file for complete search history.

(56) References Cited

U.S. PATENT DOCUMENTS

| 5,060,312 | A | 10/1991 | Delavaux | |
|---|---|---|---|---|
| 7,609,979 | B2 * | 10/2009 | Taylor | ............................ 398/204 |
| 2012/0224812 | A1 * | 9/2012 | Inoue et al. | ...................... 385/42 |

FOREIGN PATENT DOCUMENTS

| JP | 07-015386 A | 1/1995 |
|---|---|---|
| JP | 2005-164820 A | 6/2005 |

OTHER PUBLICATIONS

T. Hashimoto, et al., "Dual Polarization Optical Hybrid Module Using Planar Lightwave Circuit", 2009 IEICE Electronics Society Conference, Sep. 1, 2009, C-3-39, p. 194 and 4 pages of English Translation.*
U.S. Appl. No. 13/409,556, filed Mar. 1, 2012, Inoue, et al.
International Search Report issued Nov. 9, 2010 in PCT/JP2010/065313 filed Sep. 7, 2010 (with English Translation).
Written Opinion issued Nov. 9, 2010 in PCT/JP2010/065313 filed Sep. 7, 2010 (with English Translation).

(Continued)

*Primary Examiner* — Daniel Petkovsek
(74) *Attorney, Agent, or Firm* — Oblon, Spivak, McClelland, Maier & Neustadt, L.L.P.

(57) ABSTRACT

The invention provides a PLC-type DP-QPSK demodulator that reduces connection loss between a polarization beam splitter and a 90-degree hybrid circuit and aims at reducing the manufacturing cost and an optical transmission system using the same. In an embodiment of the invention, a PLC-type DP-QPSK demodulator that receives a DP-QPSK signal includes one PLC chip having a planar lightwave circuit. Input ports and output ports of signal light are provided at an input end and at an output end of the PLC chip, respectively. Within the planar lightwave circuit, there are integrated a polarization beam splitter that splits the DP-QPSK signal into an X-polarization QPSK signal and a Y-polarization QPSK signal, and two 90-degree hybrid circuits that mix the X-polarization QPSK signal and local oscillation light and the Y-polarization QPSK signal and local oscillation light, respectively, split each QPSK signal into orthogonal components I, Q and output them.

15 Claims, 16 Drawing Sheets

(56) References Cited

OTHER PUBLICATIONS

C. Laperle et al., "WDM Performance and PMD Tolerance of a Coherent 40-Gbit/s Dual-Polarization QPSK Transceiver," IEEE Journal of Lightwave Technology, vol. 26, No. 1, p. 168-175, Jan. 1, 2008 (in English).

Y. Sakamaki et al., "Dual Polarization Optical Hybrid Using Silica-Based Planar Lightwave Circuit Technology for Digital Coherent Receiver," Electronic Letters, vol. 46, No. 1, Jan. 7, 2010 (in English).

T. Inoue et al., "Double-Pass PBS-Integrated Coherent Mixer Using Silica-Based PLC," IEEE OFC/NFOEC 2010, OThB2, Mar. 2010 (in English).

Y. Inoue et al., "Optical 90-Degree Hybrid Using Quartz-Based PLC," 1994 Autumn IEICE Conference, C-259 (with Extracted English Translation).

M. Hosoya et al., "Construction Technology of 90°-Hybrid Balanced Optical Receiver Module Using PLC," IEICE Technical Research Report, Optical Communication System OCS_95 pp. 49-54, Sep. 1995 (with English Abstract).

S. Norimatsu et al., "An Optical 90°-Hybrid Balanced Receiver Module Using a Planar Lightwave Circuit," IEEE Photonics Technology Letters, vol. 6, No. 6, pp. 737-740, Jun. 1994 (in English).

M. Okuno et al., "Birefringence Control of Silica Waveguides on Si and Its Application to a Polarization-Beam Splitter/Switch," IEEE Journal of Lightwave Technology, vol. 12, No. 4, pp. 625-633, Apr. 1994 (in English).

Y. Hashizuma et al., "Integrated Polarization Beam Splitter Using Waveguide Birefringence Dependence on Waveguide Core Width," Electronic Letters, vol. 37, No. 25, pp. 1517-1518, Dec. 6, 2001 (in English).

N. Matsubara et al., "Silica-Based PLC-Type Polarization Beam Splitter with >30dB High Extinction Ratio Over 75nm Band Width," MOC2005. C2, 2005 (in English).

U.S. Appl. No. 13/333,432, filed Dec. 21, 2011, Kawashima, et al.
U.S. Appl. No. 13/336,111, filed Dec. 23, 2011, Kawashima, et al.

* cited by examiner

US 8,526,102 B2

PLC-TYPE DEMODULATOR AND OPTICAL TRANSMISSION SYSTEM

CROSS-REFERENCES TO RELATED APPLICATIONS

This application is a continuation application of International Application No. PCT/JP2010/065313, filed Sep. 7, 2010, which claims the benefit of Japanese Patent Application No. 2009-206115, filed Sep. 7, 2009. The contents of the aforementioned applications are incorporated herein by reference in their entities.

TECHNICAL FIELD

The present invention relates to a PLC-type demodulator that receives a polarization-multiplexed coherent modulated signal, which is obtained by performing coherent modulation on each of X-polarization light and Y-polarization light and then polarization multiplexing them, and an optical transmission system using the same.

BACKGROUND ART

As a modulation system of large-capacity signal transmission, a polarization-multiplexed digital coherent transmission system is promising, in which X-polarization light and Y-polarization light are each modulated and then polarization-multiplexed, and demodulated by a digital coherent receiver. Here, the coherent transmission system is a modulation system, in which a phase of light or even an amplitude in addition to the phase of light is modulated on the transmission side and on the reception side, local oscillation light (LO light) and signal light after transmission are mixed using an interference circuit, called a 90-degree hybrid, and received by a balanced photo detector (B-PD), and thereby, the signal light is demodulated by splitting the signal light into the real number part and the imaginary number part when the electric field of light is regarded as a complex number. However, in the receiver, the input polarization-multiplexed signal is polarization-split optically, but in general, the base polarization state of a polarization beam splitter (PBS) used therein and the base polarization state of the polarization-multiplexed signal light do not coincide with each other, and therefore, two orthogonal polarization components output from the PBS will not form the signal light the polarization multiplexing of which is demultiplexed.

However, by performing digital signal processing on an electric signal output from the B-PD as to the respective components polarization-multiplexed optically, it is possible to perform polarization demultiplexing. Further, by the digital signal processing, it is also possible to estimate the relative phase difference between the signal light and LO light and to perform processing, such as dispersion compensation and error correction.

As described above, the system that considerably simplifies optical processing by performing digital signal processing on a polarization-multiplexed coherent modulated signal in the receiver and further improves reception characteristics also is called a polarization-multiplexed digital coherent transmission system and very promising.

As a typical and practical method of the coherent modulation system, the spread of a quadrature phase shift keying is being encouraged and the quadrature phase shift keying by polarization multiplexing is known as a DP-QPSK (Dual Polarization Quadrature Phase Shift Keying). With the DP-QPSK modulation system, when the symbol rate is 10 GSymbol/s, the bit rate is 40 Gbit/s and when the symbol rate is 25 GSymbol/s, the bit rate is 100 Gbit/s, and therefore, it is possible to improve frequency use efficiency. The DP-QPSK modulation system when simply referred to means a system that applies a digital coherent receiver at the time of demodulation.

In the DP-QPSK modulation system demodulator (DP-QPSK demodulator), first, a DP-QPSK signal, which is a multiplexed signal of an X-polarization QPSK signal and a Y-polarization QPSK signal, is split into an X-polarization QPSK signal and a Y-polarization QPSK signal by a polarization beam splitter (PBS). Further, by an X-polarization 90-degree hybrid and a Y-polarization 90-degree hybrid, the split X-polarization QPSK signal and Y-polarization QPSK signal, and local oscillation light (LO light) are mixed, respectively. By receiving this mixed light with a B-PD combined together, each polarization phase-modulated signal (QPSK signal light) is converted into an intensity-modulated signal and components corresponding to the real part and the imaginary part (I-component and Q-component) of the electric field of the signal light in each polarization are extracted independently. In general, the 90-degree hybrid is known as a circuit that branches the input signal light and local oscillation light into two, respectively, gives a phase difference of 90 degrees to the local oscillation light branched into two as a relative phase difference of lightwave, and then mixes one of the signal light branched into two and one of the local oscillation light into two, and the other of the signal light branched into two and the other of the local oscillation light into two, respectively.

The PBS and the 90-degree hybrid are realized individually by a space optical system or quartz-based planar lightwave circuit (PLC) as prior art (see Non-Patent Documents 1 to 6).

In Non-Patent Documents 1 to 3, the 90-degree hybrid having a configuration in which a coupler and a PBS are combined on one PLC is disclosed and the technique to reduce the time difference (skew) between I- and Q-components by making the same the optical waveguide lengths between the I- and Q-components, respectively is disclosed.

In Documents 4, 5, 6, the 90-degree hybrid having a configuration in which a PBS is formed on one PLC is disclosed. In Document 6, the PLC on which a plurality of PBS's is cascade-connected and which is formed into a two-stage configuration is disclosed.

[Non-Patent Document 1] Y. Inoue et al., "Optical 90-degree Hybrid using Quartz-based PLC" 1994 Autumn IEICE Conference, C-259

[Non-Patent Document 2] M. Hosoya et al., "Construction Technology of 90° Hybrid Balanced Optical Receiver Module Using PLC" IEICE Technical Research Report, Optical Communication System OCS-95 pp. 49-54

[Non-Patent Document 3] S. Norimatsu et al., "An Optical 90-Hybrid Balanced Receiver Module Using a Planar Lightwave Circuit," IEEE Photon. Technol. Lett., Vol. 6, No. 6, pp. 737-740 (1994)

[Non-Patent Document 4] M. Okuno et al., "Birefringence Control of Silica Waveguides on Si and Its Application to a Polarization-Beam Splitter/Switch," J. Lightwave Technol., Vol. 12, No. 4, pp. 625-633

[Non-Patent Document 5] Y. Hashizume et al., "Integrated polarisation beam splitter using waveguide birefringence dependence on waveguide core width," Electron. Lett., vol. 37, No. 25, pp. 1517-1518 (2001)

[Non-Patent Document 6] N. Matsubara et al., "SILICA-BASED PLC-TYPE POLARIZATION BEAM SPLITTER WITH >30 dB HIGH EXTINCTION RATIO OVER 75 nm BAND WIDTH," MOC2005, C2 (2005)

SUMMARY OF INVENTION

When configuring a DP-QPSK demodulator that receives a DP-QPSK signal and extracts independently the I-component and the Q-component of each polarization component by combining the PBS and the 90-degree hybrid formed in each individual device as disclosed in Non-Patent Documents 1 to 6, problems as follows occur.

The DP-QPSK demodulator is configured to include a PBS and a 90-degree hybrid formed separately from the PBS (that is, formed on a different chip), and therefore, it is necessary to optically connect one device on which the PBS is formed (for example, PLC) and another device on which the 90-degree hybrid is formed (for example, PLC). Because of that, connection loss occurs and at the same time, alignment work and bonding work for the optical connection thereof are necessary, resulting in an increase in the number of processes and in the manufacturing cost.

The present invention has been made by focusing attention on the conventional problems described above and an object thereof is to provide a PLC-type demodulator that reduces the connection loss between the polarization beam splitter and the 90-degree hybrid circuit and aims at reducing the manufacturing cost, and an optical transmission system using the same.

Further, the inventors of the present invention have discovered such a problem that if the PBS and the 90-degree hybrid are formed on one PLC, the skew between the X- and Y-polarization components increases as a result of intensive research, and have invented a configuration to solve the problem.

When an X-polarization QPSK signal and a Y-polarization QPSK signal split in the PBS propagates respectively through the PBS in the second stage or X-polarization and Y-polarization 90-degree hybrid circuits, respectively, if there is a difference in path length, there is produced a difference between the times at which these signals are output. It is desirable for this time difference (skew) to be one-hundredth or less of, for example, a symbol time interval defined by an inverse of the symbol rate and to be 1 ps or less for a signal with 10 GSymbol/s. In order to reduce the skew to 1 ps or less, it is necessary to reduce the optical path length difference to about 300 mm in a vacuum or to about 200 mm or less in silica glass with a refractive index of about 1.5, and it is hard to adjust this precision when a space optical system is used or when components are connected by optical fibers.

Because of the above, another object of the present invention is to provide a high-performance PLC-type demodulator that reduces the skew between the X- and Y-polarization components and an optical transmission system using the same.

A first aspect of the present invention is a PLC-type demodulator that receives and demodulates a polarization-multiplexed coherent modulated signal, the demodulator comprising: one PLC chip in which a planar lightwave circuit is formed; a first input port provided at an input end of the PLC chip and inputting the polarization-multiplexed coherent modulated signal into the planar lightwave circuit; a second input port provided at the input end of the PLC chip and inputting local oscillation light into the planar lightwave circuit; at least one polarization beam splitter that splits the polarization-multiplexed coherent modulated signal input from the first input port into an X-polarization coherent modulated signal and a Y-polarization coherent modulated signal; a first 90-degree hybrid circuit that mixes and outputs the X-polarization coherent modulated signal and the local oscillation light input from the second input port; and a second 90-degree hybrid circuit that mixes and outputs the Y-polarization coherent modulated signal and the local oscillation light input from the second input port, wherein the at least one polarization beam splitter, the first 90-degree hybrid circuit, and the second 90-degree hybrid circuit are integrated within the planar lightwave circuit.

According to this configuration, alignment work and bonding work for the optical connection of the polarization beam splitter and the two 90-degree hybrid circuits are no longer necessary, and therefore, it is possible to eliminate the connection loss between the polarization beam splitter and the two 90-degree hybrid circuits and to reduce the manufacturing cost.

A second aspect of the present invention is the PLC-type demodulator in the first aspect of the present invention, further comprising a second polarization beam splitter that splits the mixed light of the X-polarization local oscillation light and the Y-polarization local oscillation light into the X-polarization local oscillation light and the Y-polarization local oscillation light, wherein the polarization beam splitter and the second polarization beam splitter each have an input side coupler and an output side coupler; the polarization beam splitter and the second polarization beam splitter are provided so that the input side coupler is located on the output end side of the PLC chip opposite to the input end and the output side coupler is located on the input end side; and the first 90-degree hybrid circuit, the polarization beam splitter, the second polarization beam splitter, and the second 90-degree hybrid circuit are arranged in this order in a direction perpendicular to the direction going from the input end toward the output end, wherein the PLC-type demodulator further comprises: a waveguide that connects the first input port and the input side coupler of the polarization beam splitter and has a bent region so as to fold propagating light; a waveguide that connects the second input port and the input side coupler of the second polarization beam splitter and has a bent region so as to fold propagating light; a first waveguide that connects the output side coupler of the polarization beam splitter and the first 90-degree hybrid circuit, transmits one of the X-polarization coherent modulated signal and the Y-polarization coherent modulated signal, and has a bent region so as to fold propagating light; a second waveguide that connects the output side coupler of the polarization beam splitter and the second 90-degree hybrid circuit, transmits the other of the X-polarization coherent modulated signal and the Y-polarization coherent modulated signal, and has a bent region so as to fold propagating light; a third waveguide that connects the output side coupler of the second polarization beam splitter and the first 90-degree hybrid circuit, transmits one of the X-polarization local oscillation light and the Y-polarization local oscillation light, and has a bent region so as to fold propagating light; and a fourth waveguide that connects the output side coupler of the second polarization beam splitter and the second 90-degree hybrid circuit, transmits the other of the X-polarization local oscillation light and the Y-polarization local oscillation light, and has a bent region so as to fold propagating light, and wherein the optical path length of the first waveguide and the optical path length of the second waveguide are the same.

A third aspect of the present invention is the PLC-type demodulator in the second aspect of the present invention, wherein the optical path lengths of the first waveguide, the second waveguide, the third waveguide, and the fourth waveguide are the same; and the second waveguide and the third waveguide intersect with each other at an intersection angle $2\theta$, wherein the first waveguide has a first bend waveguide connected to the output side coupler of the polarization beam splitter, a first straight waveguide connected to the first bend waveguide, and a second bend waveguide connected to the first straight waveguide; the second waveguide has a third bend waveguide connected to the output side coupler of the polarization beam splitter, a second straight waveguide connected to the third bend waveguide, and a fourth bend waveguide connected to the second straight waveguide; the third waveguide has a fifth bend waveguide connected to the output side coupler of the second polarization beam splitter, a third straight waveguide connected to the fifth bend waveguide, and a sixth bend waveguide connected to the third straight waveguide; and the fourth waveguide has a seventh bend waveguide connected to the output side coupler of the second polarization beam splitter, a fourth straight waveguide connected to the seventh bend waveguide, and an eighth bend waveguide connected to the fourth straight waveguide, wherein the first, third, fifth and seventh bend waveguides have the same shape as a fan-shaped arc with a bend radius r and a central angle $\theta$; and the second, fourth, sixth and eighth bend waveguides have the same shape as a fan-shaped arc with the bend radius r and a central angle greater than $\pi-2\theta$ ($0<\theta<\pi/2$), and wherein a length l of the first, second, third and fourth straight waveguides satisfies a relationship $l=(2r\cos\theta-r-p/2)/\sin\theta$ when an interval between two waveguides in the proximity of the output side coupler is assumed to be p; and the second waveguide and the third waveguide intersect with each other at a boundary between the second straight waveguide and the fourth bend waveguide and at a boundary between the third straight waveguide and the fifth bend waveguide.

A fourth aspect of the present invention is the PLC-type demodulator in the first aspect of the present invention, wherein a path through which the X-polarization coherent modulated signal propagates and a path through which the Y-polarization coherent modulated signal propagates are set so that all the effective optical path lengths from the input end toward the output end of the PLC chip are the same.

If there is a difference between the path lengths of the optical waveguides through which the X-polarization coherent modulated signal (for example, the QPSK signal (X-signal)) and the Y-polarization coherent modulated signal (for example, the QPSK signal (Y-signal)) split in the polarization beam splitter propagate, respectively, there is produced a difference between the times at which those signals are output. In the fourth aspect, the path through which the X-signal propagates and the path through which the Y-signal propagates are set so that all the effective optical path lengths from the input end to the output end are the same, and therefore, it is possible to realize a high-performance PLC-type demodulator that reduces the skew between the X- and Y-polarization components.

A fifth aspect of the present invention is the PLC-type demodulator in the first aspect of the present invention, wherein the number of the polarization beam splitters is two or more, and the polarization beam splitters and the first and second 90-degree hybrid circuits are arranged, respectively, in the proximity of each other.

According to this configuration, by arranging the polarization beam splitters and the two 90-degree hybrid circuits, respectively, in the proximity of each other, the difference in the effective optical path lengths of the signal light that propagates through a plurality of paths is suppressed from occurring, and therefore, the skew between the signal lights that pass through different paths is reduced.

A sixth aspect of the present invention is the PLC-type demodulator in the fifth aspect of the present invention, wherein the polarization beam splitters are cascade-connected in two or more stages.

According to this configuration, it is possible to increase the extinction ratio of the polarization beam splitter.

A seventh aspect of the present invention is the PLC-type demodulator in the first aspect of the present invention, wherein the PLC chip is rectangular, substantially close to square, in shape; a polarization beam splitter in a first stage is formed at the central part of the rectangular PLC chip and a second and a third polarization beam splitters in a second stage are formed in parallel sandwiching the polarization beam splitter in the first stage in between; and one of the first and second 90-degree hybrid circuits is formed on the opposite side of the polarization beam splitter in the first stage with respect to the second polarization beam splitter and the other of the first and second 90-degree hybrid circuits is formed on the opposite side of the polarization beam splitter in the first stage with respect to the third polarization beam splitter.

According to this configuration, it is possible to make an attempt to downsize the PLC chip and to realize a compact PLC-type demodulator.

An eighth aspect of the present invention is the PLC-type demodulator in the seventh aspect of the present invention, wherein an output end of the polarization beam splitter in the first stage and an input end of the second polarization beam splitter are connected from the output end toward the input end, using bend waveguides with the absolute value of the total of the rotation angles the sign of which is not reversed being greater than 180 degrees, as a folded waveguide, and the output end of the polarization beam splitter in the first stage and an input end of the third polarization beam splitter are connected from the output end toward the input end, using bend waveguides with the absolute value of the total of the rotation angles the sign of which is not reversed being greater than 180 degrees, as a folded waveguide.

According to this configuration, it is possible to arrange the two or more polarization beam splitters and the two 90-degree hybrid circuits within one PLC chip in parallel and in the proximity of each other while securing a bend radius in such a degree that the loss due to leaked light is not problematic for each bend waveguide. Consequently, it is possible to realize a compact PLC-type demodulator without deteriorating optical characteristics.

A ninth aspect of the present invention is the PLC-type demodulator in the seventh aspect of the present invention, wherein an output end of the second polarization beam splitter and an input end of one of the first and second 90-degree hybrid circuits are connected from the output end toward the input end, using bend waveguides with the absolute value of the total of the rotation angles the sign of which is not reversed being greater than 180 degrees, as a first folded waveguide, and an output end of the third polarization beam splitter and an input end of the other of the first and second 90-degree hybrid circuits are connected from the output end toward the input end, using bend waveguides with the absolute value of the total of the rotation angles the sign of which is not reversed being greater than 180 degrees, as a second folded waveguide.

According to this configuration, it is possible to arrange the two or more polarization beam splitters and the two 90-degree hybrid circuits within one PLC chip in parallel and in the proximity of each other while securing a bend radius in such a degree that the loss due to leaked light is not problematic for each bend waveguide. Consequently, it is possible to realize a compact PLC-type demodulator without deteriorating optical characteristics.

A tenth aspect of the present invention is the PLC-type demodulator in the first aspect of the present invention, wherein the polarization beam splitter is a Mach-Zehnder interferometer comprising an input side coupler as an input end of the polarization beam splitter, an output side coupler as an output end of the polarization beam splitter, and two arm waveguides connected between both the couplers.

An eleventh aspect of the present invention is the PLC-type demodulator in the ninth aspect of the present invention, wherein each of the polarization beam splitter, the second polarization beam splitter, and the third polarization beam splitter is a Mach-Zehnder interferometer comprising an input side coupler as an input end of the polarization beam splitter, an output side coupler as an output end of the polarization beam splitter, and two arm waveguides connected between both the couplers, a cross port of the output side coupler of the second polarization beam splitter and an input side coupler of one of the first and second 90-degree hybrid circuits are connected by the first folded waveguide, and a cross port of the output side coupler of the third polarization beam splitter and an input side coupler of the other of the first and second 90-degree hybrid circuits are connected by the second folded waveguide.

According to this configuration, it is possible to increase the bend radius of the folded waveguide that connects the second polarization beam splitter and one of the 90-degree hybrid circuits and the bend radius of the folded waveguide that connects the third polarization beam splitter and the other of the 90-degree hybrid circuits, respectively. Further, it can be expected to increase the polarization extinction ratio of each of the polarization beam splitters.

A twelfth aspect of the present invention is the PLC-type demodulator in the first aspect of the present invention, wherein the second input port has an input port of X-polarization local oscillation light having the same polarized wave and the same wavelength as the X-polarization coherent modulated signal and an input port of Y-polarization local oscillation light having the same polarized wave and the same wavelength as the Y-polarization coherent modulated signal.

According to this configuration, it is possible to realize a high-performance PLC-type receiver that reduces the skew between two signals which are in the same polarization state and enter the two 90-degree hybrid circuits, respectively.

A thirteenth aspect of the present invention is the PLC-type demodulator in the first aspect of the present invention, further comprising: a first path through which the X-polarization coherent modulated signal split in the polarization beam splitter propagates and which connects the polarization beam splitter and the first 90-degree hybrid circuit; a second path through which the Y-polarization coherent modulated signal split in the polarization beam splitter propagates and which connects the polarization beam splitter and the second 90-degree hybrid circuit; and a half-wavelength plate inserted into the first path or the second path, wherein the PLC-type demodulator is configured so that signals enter the first and second 90-degree hybrid circuits, respectively, in the same polarization state.

There exists a difference in the effective refractive index caused by birefringence between the X-polarization coherent modulated signal (for example, the QPSK signal (X-signal)) and the Y-polarization coherent modulated signal (for example, the QPSK signal (Y-signal)) split in the polarization beam splitter, and therefore, this forms a factor of the skew.

According to this configuration, it is possible to reduce the skew (time difference) that occurs due to the effective refractive index difference resulting from birefringence between the signals that enter each of the 90-degree hybrid circuits because the X-signal and the Y-signal enter the two 90-degree hybrid circuits in the same polarization state, respectively. Due to this, it is possible to realize a high-performance PLC-type demodulator that reduces the skew between the two signals.

A fourteenth aspect of the present invention is the PLC-type demodulator in the thirteenth aspect of the present invention, wherein the number of the second input ports is one, and the PLC-type demodulator further comprises a path which is configured so as to split X-polarization or Y-polarization local oscillation light input from the second input port within the planar lightwave circuit and input it to the first and second 90-degree hybrid circuits, respectively.

According to this configuration, it is necessary to provide only one LO light source that outputs X-polarization or Y-polarization LO light as a light source of local oscillation light (LO light source), and therefore, it is possible to further reduce the manufacturing cost of the receiver.

A fifteenth aspect of the present invention is the PLC-type demodulator in the seventeenth aspect of the present invention, further comprising: two inspection input ports for inputting light caused to pass through only the second and third polarization beam splitters; and two inspection output ports for outputting light having passed through the second and third polarization beam splitters, respectively, wherein a heater is provided on at least one of the two arm waveguides of the polarization beam splitter in the first stage.

According to this configuration, while measuring light output from the two inspection output ports, a voltage is applied to the heater and the phase trimming is performed individually so that the polarization extinction ratios of the second and third polarization beam splitters corresponding to the output ports, respectively, satisfy desired values. Due to this, it is possible to adjust the polarization extinction ratios of the second and third polarization beam splitters to desired values.

A sixteenth aspect of the present invention is an optical transmission system that uses a PLC-type demodulator, the system comprising: a transmitter that modulates a lightwave and outputs a polarization-multiplexed light signal, an optical transmission path that transmits the polarization-multiplexed light signal output from the transmitter; and a receiver that performs coherent reception of the polarization-multiplexed light signal transmitted through the transmission path, wherein the receiver includes: a light source that outputs local oscillation light; the PLC-type demodulator according to the first aspect of the present invention; an optical detector for X-polarization I channel and Q channel; an optical detector for Y-polarization I channel and Q channel; and a digital signal processing circuit.

A seventeen aspect of the present invention is the optical transmission system in the sixteenth aspect of the invention, wherein a method of the modulation is quadrature phase shift keying.

According to an aspect of the present invention, it is possible to realize a PLC-type demodulator that eliminates the connection loss between the polarization beam splitter and the 90-degree hybrid circuit and aims at reducing the manufacturing cost, and an optical transmission system using the same.

Further, according to another aspect of the present invention, it is possible to realize a high-performance PLC-type demodulator that reduces the skew between X- and Y-polarization components, and an optical transmission system using the same.

DESCRIPTION OF EMBODIMENTS

Figure 1:
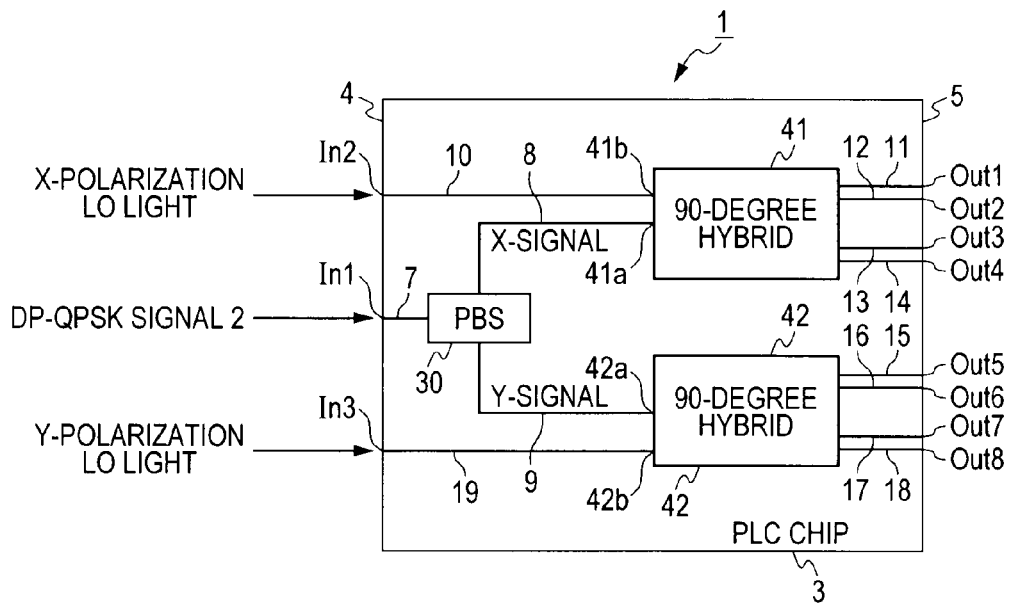
FIG. 1 is a block diagram showing a basic configuration of a PLC-type DP-QPSK demodulator according a first embodiment of the present invention.

Hereinafter, embodiments that embody the present invention are explained based on the drawings. In the explanation of each of the embodiments, the same reference numeral is attached to the same component and duplicated explanation is omitted.

<PLC-Type DP-QPSK Demodulator>

First, as an example of a PLC-type demodulator that receives a polarization-multiplexed coherent modulated signal, each embodiment of a DP-QPSK modulation system PLC-type DP-QPSK demodulator that receives a DP-QPSK signal is explained.

(PLC-Type DP-QPSK Demodulator According to First Embodiment)

a PLC-type DP-QPSK demodulator 1 according to a first embodiment is explained based on FIG. 1 to FIG. 5.

The PLC-type DP-QPSK demodulator 1 is a DP-QPSK modulation system demodulator that receives, from a transmitter (not shown schematically), a DP-QPSK signal 2 formed by multiplexing an X-polarization QPSK signal and a Y-polarizing QPSK signal, which are obtained by performing quadrature phase shift keying on X-polarization light and Y-polarization light orthogonal to each other, respectively.

In the present specification, the "DP-QPSK demodulator" used in the DP-QPSK modulation system optical transmission system means a device to which a DP-QPSK signal (polarization-multiplexed quadrature phase shift keyed signal) formed by multiplexing an X-polarization QPSK signal and a Y-polarization QPSK signal is input, and which splits the signal into two orthogonal polarization components by a polarization beam splitter (PBS) and then mixes the signal light of each polarization component and local oscillation light (LO light) by an interference circuit called a 90-degree hybrid and outputs it to a balanced photodiode (B-PD). That is, the "DP-QPSK demodulator" referred to in the present specification is a receiver used in the DP-QPSK modulation system optical transmission system not including a B-PD.

The demodulator of the present invention is a demodulator including at least a PBS and a 90-degree hybrid and its application is not limited to a DP-QPSK modulated signal and it can also be applied to an optical transmission system that uses a general coherent modulation system, such as QAM (Quadrature Amplitude Modulation) and OFDM (Orthogonal Frequency Division Multiplexing). Hereinafter, description is given on the supposition that the present invention is applied to the DP-QPSK modulation.

The PLC-type DP-QPSK demodulator (hereinafter, referred to as demodulator) 1 includes one PLC chip 3 in which a planar lightwave circuit is formed. In the PLC chip 3, a planar lightwave circuit (PLC) including a plurality of optical waveguides comprising a core and cladding by combining the optical fiber manufacturing technique and the semiconductor micro fabrication technique is formed on a substrate, not shown schematically, such as quartz substrate and silicon substrate. The PLC is, for example, a quartz-based planar lightwave circuit.

At an input end 4 of the PLC chip 3, an input port In1 of the DP-QPSK signal 2 as a polarization-multiplexed coherent modulated signal and input ports In2, In3 of local oscillation light are provided. To the input port In2, local oscillation light (X-polarization LO light) having the same polarized wave and the same wavelength as the X-polarization QPSK signal is input. To the input port In3, local oscillation light (Y-polarization LO light) having the same polarized wave and the same wavelength as the Y-polarization QPSK signal is input.

At an output end 5 of the PLC chip 3, output ports Out1 to Out8 of signal light are provided, respectively. From the output ports Out1, 2, signal light of the I-channel component (real part on the complex plane: cosine component) of the orthogonal components I, Q of the X-polarization QPSK signal converted into an intensity-modulated signal is output and from the output ports Out3, 4, signal light of the Q-channel component (imaginary part on the complex plane: sine component) of the orthogonal components I, Q of the X-polarization QPSK signal converted into an intensity-modulated signal is output, respectively.

From the output ports Out5, 6, signal light of the I-channel component of the Y-polarization QPSK signal converted into an intensity-modulated signal is output and from the output ports Out7, 8, signal light of the Q-channel of the Y-polarization QPSK signal converted into an intensity-modulated signal is output, respectively.

Within the PLC of the PLC chip 3, there are integrated a polarization beam splitter (PBS) 30 that polarization-splits the DP-QPSK signal 2 into the X-polarization QPSK signal (X-signal) and the Y-polarization QPSK signal (Y-signal), and two X-polarization and Y-polarization 90-degree hybrid circuits 41, 42.

Figure 2:
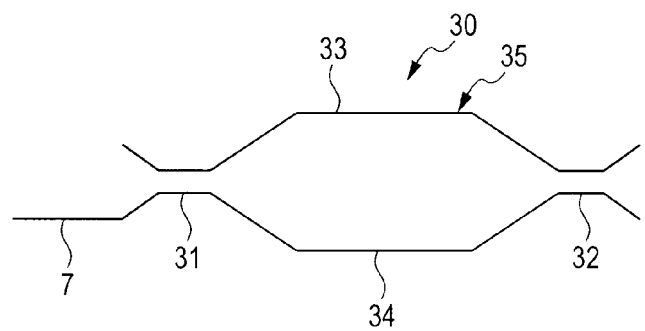
FIG. 2 is an outline configuration diagram showing a polarization beam splitter (PBS) used in the PLC-type DP-QPSK demodulator in FIG. 1.

As shown in FIG. 2, the PBS 30 includes a Mach-Zehnder interferometer (MZI) 35 having two couplers 31, 32 and two arm waveguides 33, 34 connected between both the couplers 31, 32. The coupler 31 on the input side and the coupler 32 on the output side are each a 3-dB coupler including a directional coupler (DC), respectively. To one of two input ports of the coupler 31 on the input side, an input optical waveguide 7 is connected (see FIG. 1, FIG. 2). That is, the PBS 30 is configured to split the DP-QPSK signal 2 as a polarization-multiplexed coherent modulated signal into the X-polarization component and the Y-polarization component.

Figure 3:
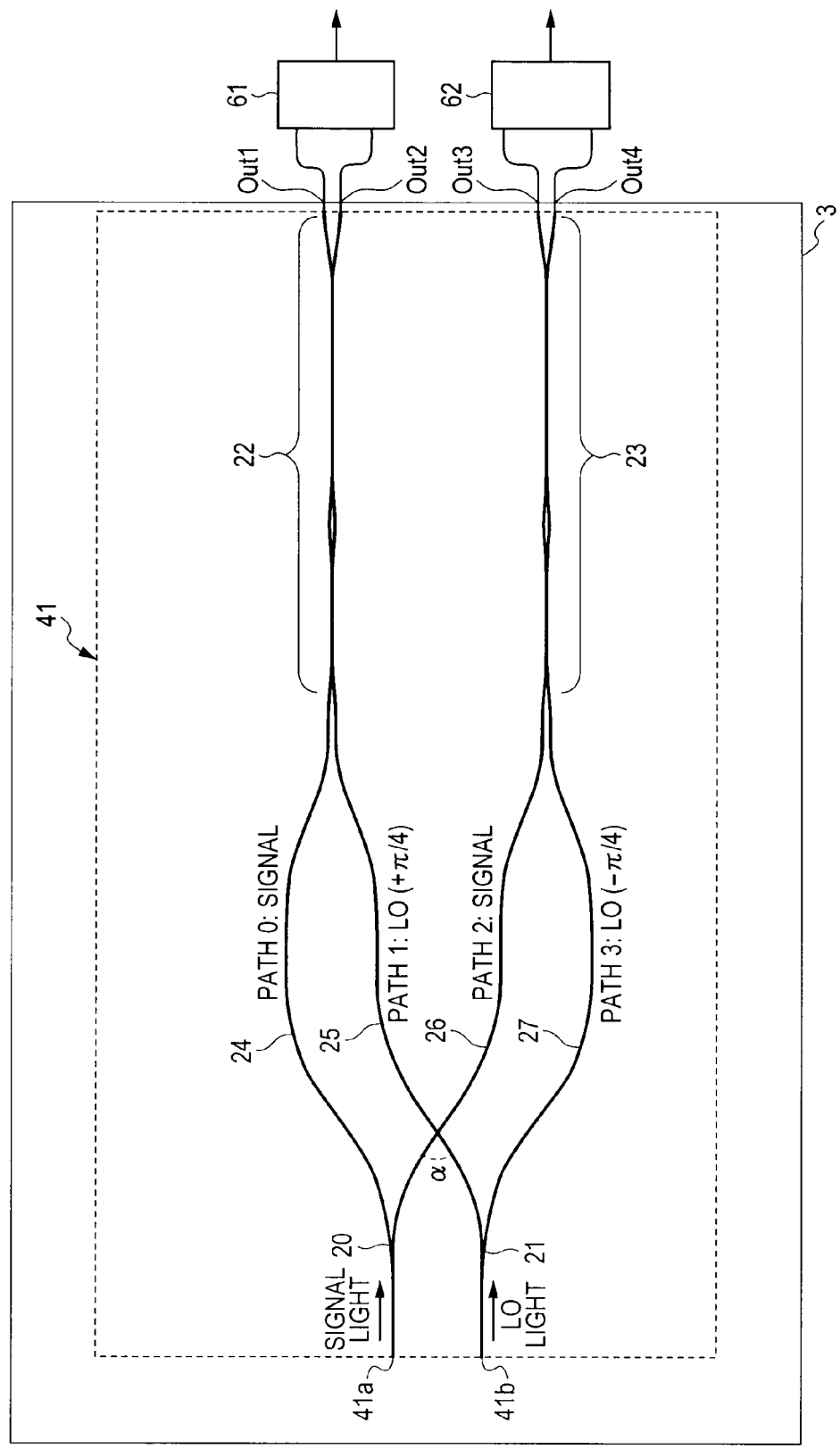
FIG. 3 is an outline configuration diagram showing a 90-degree hybrid circuit used in the DP-QPSK demodulator in FIG. 1.

Next, the 90-degree hybrid circuits 41, 42 are explained. The 90-degree hybrid circuit 41 mixes the X-polarization QPSK signal as the X-polarization signal split in the PBS 30 and local oscillation light, splits the X-polarization QPSK signal into the orthogonal components I, Q, and outputs them. That is, the 90-degree hybrid 41 mixes and outputs the X-polarization signal split in the PBS 30 and local oscillation signal. As shown in FIG. 3, the 90-degree hybrid circuit 41 includes two input side couplers 20, 21, two output side couplers 22, 23, and arm waveguides 24 to 27 connected between the input side couplers 20, 21 and the output side couplers 22, 23. As the input side couplers 20, 21, a Y-branch coupler is used, respectively, and as the output side couplers 22, 23, a wavelength insensitive directional coupler (WINC) is used, respectively. In the following explanation, the arm waveguides 24 to 27 are sometimes referred to as path 0 to path 3.

On an input port 41a of the 90-degree hybrid circuit 41, the X-signal (X-polarization QPSK signal) is incident and on an input port 41b, X-polarization LO light is incident, respectively, (see FIG. 1, FIG. 3). The 90-degree hybrid circuit 41 is configured so that the X-signal, after being branched into two in the input side coupler 20, passes through the paths 0, 2, respectively, and is incident on one of the input ports of the couplers 22, 23. The 90-degree hybrid circuit 41 is configured so that the LO light, after being branched into two in the input side coupler 21, passes through the paths 1, 3, respectively, and is incident on the other input port of the couplers 22, 23.

The paths 0, 2 are set so as to have an identical optical path length L and the paths 1, 3 are set so that the difference in their optical path lengths is 90 degrees in terms of phase. For example, it may also be possible to lengthen the optical path length of the path 1 longer than the optical path length of the paths 0 and 2 by an amount corresponding to $\pi/4$ radian in terms of phase and to shorten the optical path length of the path 3 shorter than the optical path length of the paths 0 and 2 by an amount corresponding to $\pi/4$ radian in terms of length.

Figure 4:
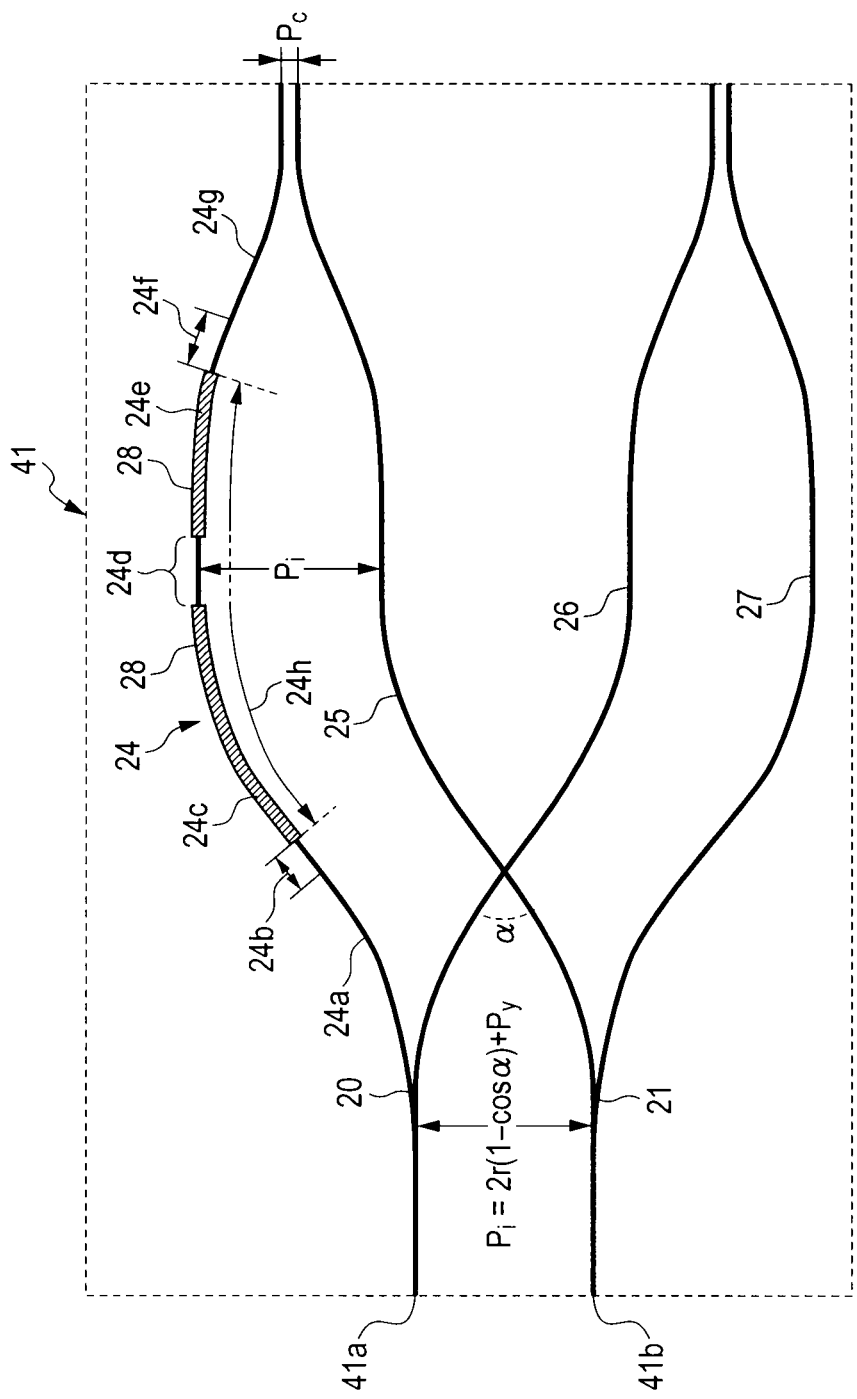
FIG. 4 is an explanatory diagram showing details of the 90-degree hybrid circuit in FIG. 3.
Figure 5:
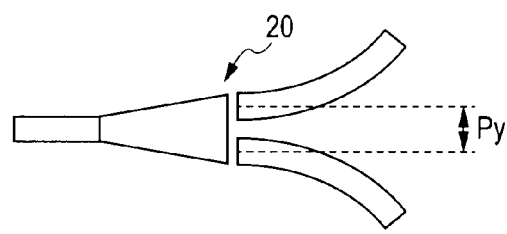
FIG. 5 is an explanatory diagram of a pitch between output waveguides in a Y-branch coupler used in the 90-degree hybrid circuit in FIG. 3.

As shown in FIG. 4, the path 0 (the arm waveguide 24) includes a bend waveguide 24a of a rotation angle $+\theta_1$, a straight waveguide 24b of a length $l_1$, a bend waveguide 24c of a rotation angle $-\theta_1$, a straight waveguide 24d of a length h, a bend waveguide 24e of a rotation angle $-\theta_2$, a straight waveguide 24f of a length $l_2$, and a bend waveguide 24g of a rotation angle $+\theta_2$. A bend radius r of each bend waveguide is set to an optimum value, for example, 2,000 μm. In FIG. 4, reference numeral 24h represents a section in which a phase trimming heater 28 is disposed.

In discussing the value of a rotation angle θ of the bend waveguide, it is defined that the sign is plus when the bend waveguide rotates counterclockwise in the direction in which light travels and minus when it rotates clockwise in the direction in which light travels. The rotation angle θ is an angle (central angle) formed by two bend radii that form an arc when the bend waveguide coincides with the arc of the bend radius r (curvature radius r). Consequently, the fan-shaped arc of the bend radius r and the central angle (that is, the rotation angle) θ is the shape of the bend waveguide of the rotation angle θ.

The 90-degree hybrid circuit 41 has a structure in which the optical path length of the path 0 can be adjusted to an arbitrary optical path length by adjusting the four parameters $\theta_1, \theta_2, l_1, l_2$ under the condition that the bend radius r of each of the bend waveguides 24a, 24c, 24e, 24g is fixed. Other paths 1 to 3 (the arm waveguides 25 to 27) also have the same structure.

In the 90-degree hybrid circuit 41, a pitch Pi between input ports 41a, 41b (pitch between input ports) is determined uniquely by the following expression using an angle (intersection angle) α at which the path 1 and the path 2 intersect with each other, the bend radius r of the bend waveguide 24a, and a pitch Py (see FIG. 5) between the output waveguides of the Y-branch couplers 20, 21.

$$Pi = 2r(1-\cos\alpha) + Py$$

Here, the bend waveguides of the arm waveguides 24 to 27 have the same bend radius r.

The 90-degree hybrid circuit 42 also has the same structure as that of the 90-degree hybrid circuit 41. In the demodulator 1 having the above configuration, first, the DP-QPSK signal 2 input from the input port In1 passes through the input optical waveguide 7 and enters the PBS 30 and is polarization-split into the X-polarization QPSK signal (X-signal) and the Y-polarization QPSK signal (Y-signal) by the PBS 30. The X-signal passes through an optical waveguide 8 and enters the input port 41a of the 90-degree hybrid circuit and the Y-signal passes through an optical waveguide 9 and enters the input port 42a of the 90-degree hybrid circuit 42, respectively.

In the 90-degree hybrid circuit 41, the X-polarization LO light that passes through an optical waveguide 10 from the input port In2 and enters the circuit and the X-signal that passes through the optical waveguide 8 and enters the circuit are mixed. That is, the X-signal that passes through the path 0 and the LO light that passes through the path 1 are mixed in the coupler 22 on the output side and at the same time, the X-signal that passes through the path 2 and the LO light that passes through the path 3 are mixed in the coupler 23 on the output side.

Due to this, the signal light of the I-channel component and the signal light of the Q-channel component, which is the X-signal, that is, the X-polarization QPSK signal, converted into an intensity-modulated signal, are extracted independently. The signal light of the I-channel component in X polarization passes through output optical waveguides 11, 12 and is output from the output ports Out1, 2. On the other hand, the signal light of the Q-channel component passes through output optical waveguides 13, 14 and is output from the output ports Out3, 4, respectively. The signal light of the I-channel component and the Q-channel component in X polarization is input to balanced photodiodes (B-PD) 61 and 62, respectively, via, for example, an optical fiber or without passing therethrough.

On the other hand, in the 90-degree hybrid circuit 42, the Y-polarization LO light that passes through an optical waveguide 19 from the input port In3 and enters the circuit and the Y-signal (the Y-polarization signal split in the PBS 30), which is the Y-polarization QPSK signal that passes through the optical waveguide 9 and enters the circuit, are mixed. That is, the 90-degree hybrid circuit 42 mixes and outputs the Y-polarization signal split in the PBS 30 and local oscillation light. Due to this, the signal light of the I-channel component and the signal light of the Q-channel, which is the Y-signal converted into an intensity-modulated signal, are extracted independently. The signal light of the I-channel component in Y polarization passes through output optical waveguides 15, 16 and is output from the output ports Out5, 6. On the other hand, the signal light of the Q-channel component passes through output optical waveguides 17, 18 and is output from the output ports Out7, 8, respectively. The signal light of the I-channel component and the Q-channel component in Y polarization is input to the B-PD, not shown schematically, via an optical fiber or without passing therethrough, respectively.

As described above, the demodulator 1 is a coherent transmission system demodulator in which the 90-degree hybrid circuits 41, 42 mix the X-signal and the X-polarization LO light, and the Y-signal and the Y-polarization LO light, respectively.

Further, in the demodulator 1, from the output ports Out1 to 4, the I-channel and the Q-channel of the X-signal are output and from the output ports Out5 to 8, the I-channel and the Q-channel of the Y signal are output.

Then, in the demodulator 1, the plurality of the paths of signal light, that is, the path of the X-signal light and the path of the Y-signal light are set so that all the effective optical path lengths from the input end 4 to the output end 5 are the same.

For example, in the demodulator 1, the path of the X-signal and the path of the Y-signal are set so that the difference in the effective optical path length from the input end 4 to the output end 5 is equal to or less than a desired value. Here, as an example, it is preferable for a desired value when the optical path length difference is converted into a difference in arrival time to be, as an example, 5 ps or less.

Specifically, settings are done so that the effective optical path lengths of the four paths from the output part of the PBS 30 to the output ports Out1 to 4 in the path of the X-signal split by the PBS 30 and the effective optical path lengths of the four paths from the output part of the PBS 30 to the output ports Out5 to 8 in the path of the Y-signal split by the PBS 30 are the same, respectively.

According to the first embodiment having the above configuration, the following technical advantages can be obtained.

(1) Within the PLC of the PLC chip 3, the PBS that splits the DP-QPSK signal 2 into the X-polarization QPSK signal (X-signal) and the Y-polarization QPSK signal (Y-signal) and the two 90-degree hybrid circuits 41, 42 for X polarization and Y polarization are integrated. Because of this, when constituting the DP-QPSK demodulator using the PBS and the two 90-degree hybrid circuits, alignment work and bonding work for the optical connection of the PBS and the two 90-degree hybrid circuits are no longer necessary. As a result of that, it is possible to eliminate the connection loss between the PBS and the two 90-degree hybrid circuits and to reduce the manufacturing cost.

(2) The inventors of the present invention have found such a problem that the skew between X- and Y-polarization components increases if the PBS and the 90-degree hybrid circuit are formed on one PLC and invented a configuration to solve the problem.

If there is a difference in the path length between the optical waveguides through which the X-polarization QPSK signal (X-signal) and the Y-polarization QPSK signal (Y-signal) split in the PBS propagate, respectively, there occurs a difference between times at which these signals are output.

Because of the above, the configuration is set so that the effective optical path lengths of the four paths from the output part of the PBS 30 to the output ports Out1 to 4 in the path of the X-signal and the effective optical path lengths of the four paths from the output part of the PBS 30 to the output ports Out5 to 8 in the path of the Y-signal are the same, respectively. Due to this, it is possible to realize a high-performance PLC-type DP-QPSK demodulator that reduces the skew between the X- and Y-polarization components.

For example, it is made possible to reduce the skew between the X- and Y-polarization components to 5 ps or less in a DP-QPSK modulation system PLC-type DP-QPSK demodulator with a symbol rate of 25 GSymbol/s and a bit rate of 100 Gbit/s.

(PLC-Type DP-QPSK Demodulator According to Second Embodiment)

Figure 6:
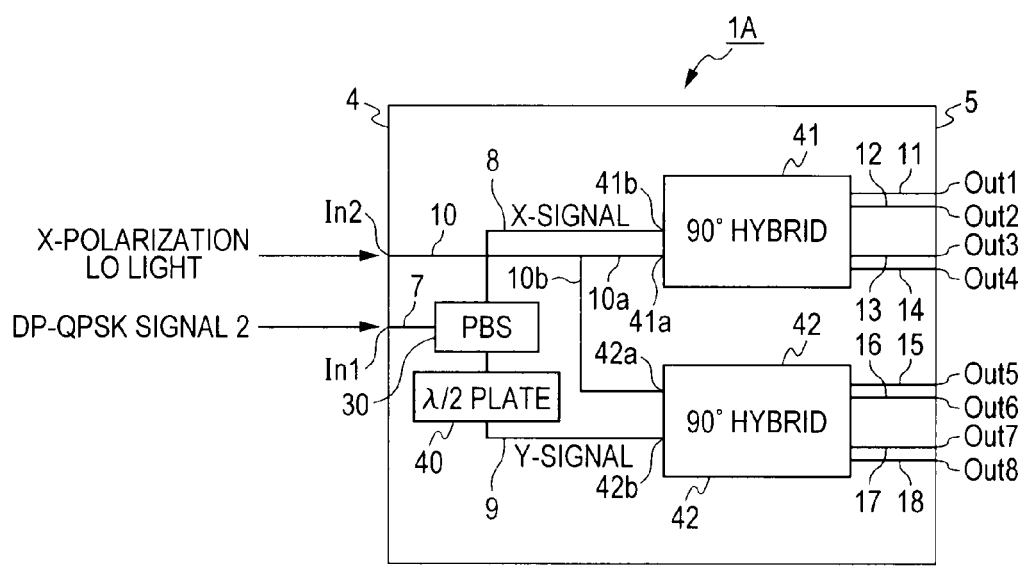
FIG. 6 is a block diagram showing a basic configuration of a PLC-type DP-QPSK demodulator according to a second embodiment of the present invention.

FIG. 6 shows a basic configuration of a PLC-type DP-QPSK demodulator 1A according to a second embodiment.

In the PLC-type DP-QPSK modulator 1A, the number of the input ports of LO light is set to one in the PLC-type DP-QPSK demodulator 1 according to the first embodiment. In the present embodiment, as an example, only the input port In2 to which the X-polarization LO light is input is provided as an input port of LO light.

The demodulator 1A is configured so that the X-polarization LO light is branched into two within the PLC and each of the branched X-polarization LO light enters the 90-degree hybrid circuits 41, 42, respectively. The X-polarization LO light passes through the optical waveguide 10 and after branched into two to optical waveguides 10a, 10b, is incident on the 90-degree hybrid circuits 41, 42, respectively.

In the demodulator 1A, a half-wavelength plate ($\lambda/2$ plate) 40 is inserted into the path through which one of each polarization (X-polarization and Y-polarization) signal (each is modulated according to independent information and hereinafter, referred to as the X-signal and the Y-signal) propagates, which is the DP-QPSK signal 2 polarization-split in the PBS 30. The major axis of the wavelength plate 40 makes an angle of 45 degrees with an axis vertical to the direction in which light is guided and in parallel with the plane of the PLC and the X-polarization component of the light having passed therethrough is converted into Y polarization and the Y-polarization component into X polarization, respectively. Because of this, the X-signal and the Y-signal are caused to enter each of the 90-degree hybrid circuits 41, 42 in the same polarization state. In the present embodiment, as an example, the half-wavelength plate 40 is inserted into the optical waveguide 9 through which the Y-signal polarization-split in the PBS 30 propagates, and therefore, both the X-signal and the Y-signal are caused to enter each of the 90-degree hybrid circuits 41, 42 in the X-polarization state, respectively. Because there exists a difference in the effective refractive index caused by birefringence between each of the polarization signals polarization-split in the PBS 30, this forms a factor of skew, however, by adopting the above-mentioned configuration, it is possible to reduce the skew.

Other configurations in the demodulator 1A are the same as those in the demodulator 1 according to the first embodiment.

According to the second embodiment having the above configuration, the following technical advantages are obtained in addition to the technical advantages achieved in the first embodiment.

The demodulator 1 according to the first embodiment requires two light sources, that is, the LO light source that outputs X-polarization LO light and the LO light source that outputs Y-polarization LO light. In contrast to this, only the LO light source that outputs X-polarization LO light may be provided as the LO light source in the demodulator 1A according to the present embodiment, and therefore, it is possible to further reduce the manufacturing cost of the optical transmission system configured by using the demodulator 1A.

In the demodulator 1A, the half-wavelength plate 40 is inserted into the optical waveguide 9 through which the Y-signal polarization-split in the PBS 30 propagates, however, it may also be possible to insert the half-wavelength plate 40 into the optical waveguide 8 through which the X-signal polarization-split in the PBS 30 propagates. In this configuration, both the X-signal and the Y-signal enter each of the 90-degree hybrid circuits 41, 42 in the Y-polarization state, respectively. As described above, by providing the half-wavelength plate 40 between the PBS 30 and the 90-degree hybrid 41 for the X-signal or between the PBS 30 and the 90-degree hybrid 42 for the Y-signal, it is possible to integrate the polarization state of the QPSK signal split by the PBS 30 into X polarization or Y polarization. Further, it is also possible to cause the two QPSK signals after polarization is integrated, that is, the QPSK signal caused to enter the 90-degree hybrid 41 and the QPSK signal caused to enter the 90-degree hybrid 42 to propagate through the paths of the same effective refractive index.

As described above, in the present embodiment, it is possible to demodulate even the DP-QPSK signal formed by multiplexing two QPSK signals, that is, the X-polarization QPSK signal and the Y-polarization QPSK signal, with one of the polarization LO lights and to reduce the skew resulting from birefringence by providing the half-wavelength plate 40.

(PLC-Type DP-QPSK Demodulator According to Third Embodiment)

Figure 7:
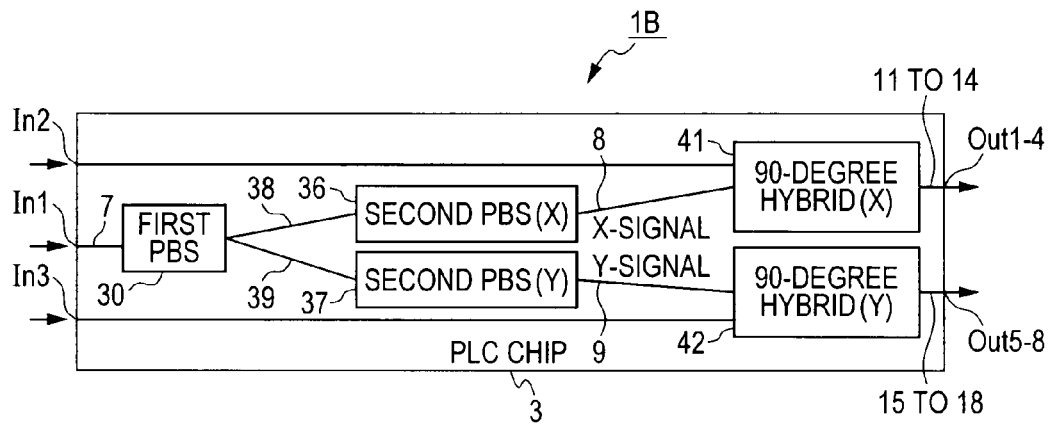
FIG. 7 is a block diagram showing a basic configuration of a PLC-type DP-QPSK demodulator according to a third embodiment of the present invention.

FIG. 7 shows a basic configuration of a PLC-type DP-QPSK demodulator 1B according to a third embodiment.

In the PLC-type DP-QPSK demodulator 1B, three PBSs, that is, the PBS 30 and PBSs 36, 37, are provided within PLC of the PLC chip 3 in the PLC-type DP-QPSK demodulator 1 according to the first embodiment. The second PBS(X) 36 and the second PBS(Y) 37 are cascade-connected to the first PBS 30, respectively. Further, in the demodulator 1B, in order to make an attempt to downsize the PLC chip 3, the PBSs 36 and 37 and the two 90-degree hybrid circuits 41, 42 are put in the proximity of each other in the spatial arrangement.

The PBSs 36, 37 are each a MZI that has two couplers and the two arm waveguides 33, 34 connected between both the couplers as the PBS 30 in the demodulator 1 according to the first embodiment (see FIG. 2).

In the demodulator 1B, first, the DP-QPSK signal 2 input from the input port In1 passes through the input optical waveguide 7 and enters the first PBS 30 and is polarization-split into the X-polarization QPSK signal (X-signal) and the Y-polarization QPSK signal (Y-signal) by the first PBS 30. The X-signal and the Y-signal pass through optical waveguides 38, 39 and enter the second PBS(X) 36 and the second PBS(Y) 37, respectively.

The second PBS(X) 36 cuts the Y-polarization component included in the X-signal output from the first PBS 30. Due to this, from the second PBS(X) 36, the X-signal with a high extinction ratio is output to the 90-degree hybrid circuit (X) 41 for X polarization via the optical waveguide 8. On the other hand, the second PBS(Y) cuts the X-polarization component included in the Y-signal output from the first PBS 30. Due to this, from the second PBS(Y) 37, the Y-signal with a high extinction ratio is output to the 90-degree hybrid circuit (Y) 42 for Y polarization via the optical waveguide 9.

In FIG. 7, the X-polarization LO light and the Y-polarization LO light are caused to enter the 90-degree hybrid circuit (X) 41 and the 90-degree hybrid circuit (Y) 42, respectively, as in the demodulator 1 according to the first embodiment. Other configurations of the demodulator 1B are the same as those of the demodulator 1.

According to the third embodiment having the above configuration, the following technical advantage is obtained in addition to the technical advantages achieved in the first embodiment.

For the X-signal, it is possible to increase the polarization extinction ratio when entering the 90-degree hybrid (X) 41 by forming a two-stage configuration of the first PBS 30 and the second PBS(X) 36. For the Y-signal, it is possible to increase the polarization extinction ratio when entering the 90-degree hybrid (Y) 42 by forming a two-stage configuration of the first PBS 30 and the second PBS(Y) 37. Further, the PBSs 36, 37 and the two 90-degree hybrid circuits 41, 42 are put in the proximity of each other, respectively, in the spatial arrangement, and therefore, it is possible to make an attempt to downsize the PLC chip 3 and to realize a compact PLC-type DP-QPSK demodulator.

(PLC-Type DP-QPSK Demodulator According to Fourth Embodiment)

Figure 8:
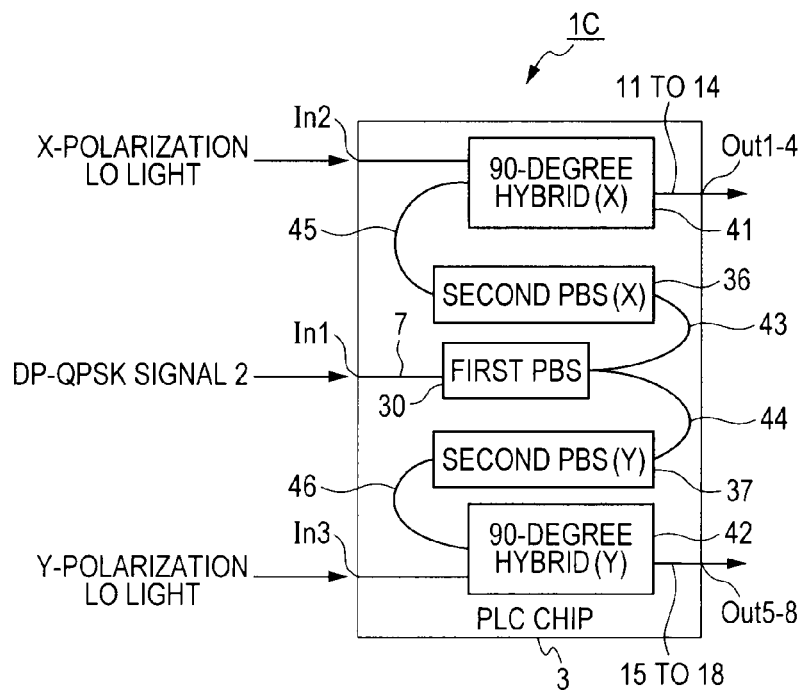
FIG. 8 is a block diagram showing a basic configuration of a PLC-type DP-QPSK demodulator according to a fourth embodiment of the present invention.

FIG. 8 shows a basic configuration of a PLC-type DP-QPSK demodulator 1C according to a fourth embodiment. In the PLC-type DP-QPSK demodulator 1C, the three PBSs 30, 36, 37 are provided within the PLC of the PLC chip 3. Further, in the demodulator 1C, the first PBS 30 in the first stage, the second PBS(X) 36 and the third PBS(Y) 37 in the second stage formed in parallel with the first PBS 30 sandwiched in between, and the 90-degree hybrid circuits 41, 42 formed in parallel with the second and third PBSs 36, 37 sandwiched in between are provided.

The first PBS 30 and the second and third PBSs 36, 37 are connected via folded waveguides 43, 44, respectively, and the second and third PBSs 36, 37 and the 90-degree hybrid circuits 41, 42 are connected via folded waveguides 45, 46, respectively.

Here, each folded waveguide includes a bend waveguide having a fixed curvature radius and a rotation angle of 180 degrees on the PLC substrate surface.

In the demodulator 1C, a configuration in which all circuits are arranged in a narrow region of the PLC chip 3 in the shape of a rectangle substantially a square is adopted in order to make an attempt to downsize the PCL chip 3. Other configurations of the demodulator 1C are the same as those of the demodulator 1.

According to the fourth embodiment having the above configuration, it is possible to further downsize the PLC-type DP-QPSK demodulator 1B according to the third embodiment.

(PLC-Type DP-QPSK Demodulator According to Fifth Embodiment)

Figure 9:
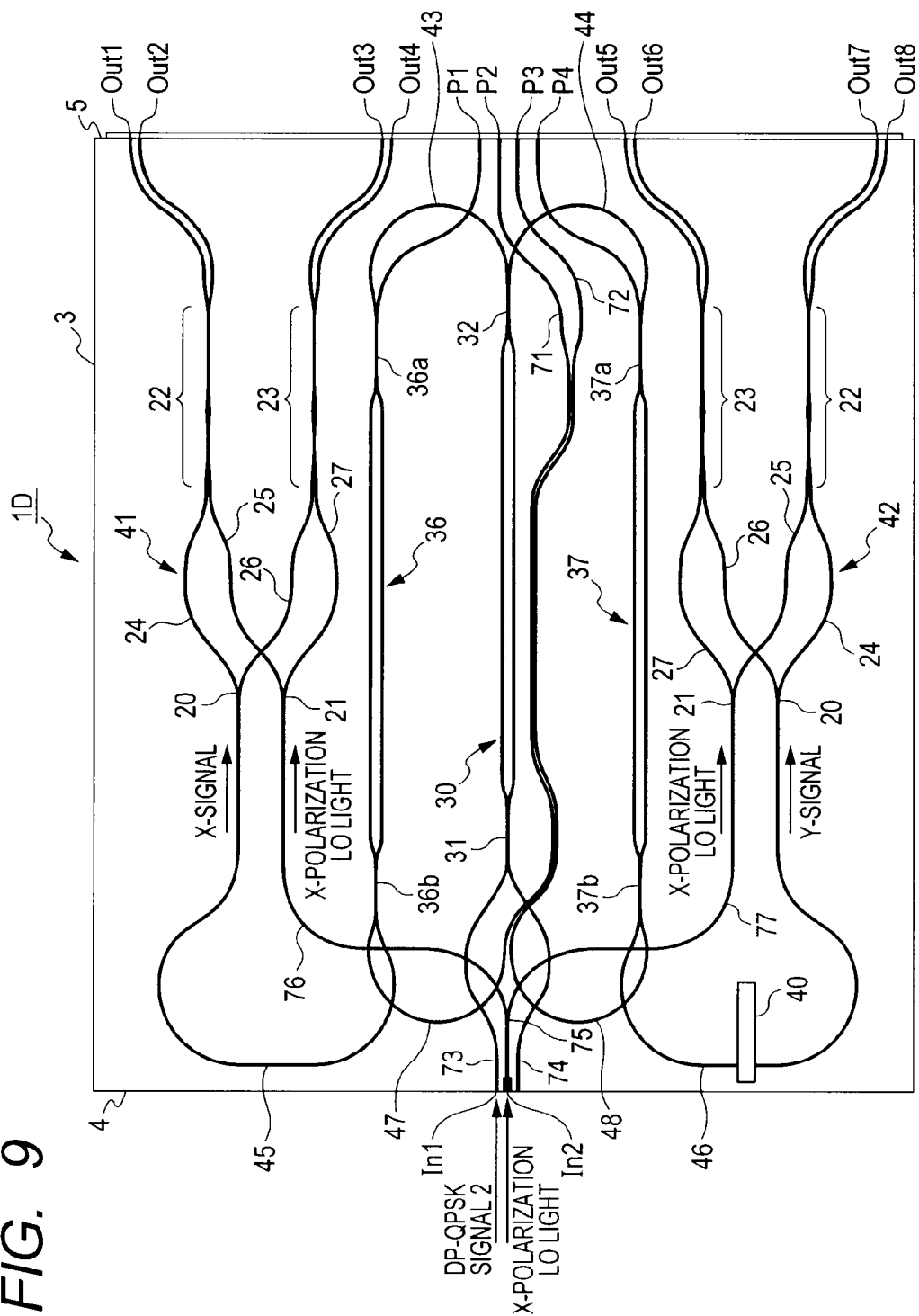
FIG. 9 is a block diagram showing a basic configuration of a PLC-type DP-QPSK demodulator according to a fifth embodiment of the present invention.

Next, a PLC-type DP-QPSK demodulator 1D according to a fifth embodiment is explained based on FIG. 9 to FIG. 18. FIG. 9 shows a basic configuration of the PLC-type DP-QPSK demodulator 1D according to the fifth embodiment. In FIG. 11 to FIG. 18, +θ indicates that the rotation angle θ of the bend waveguide is a plus value and −θ indicates that the rotation angle θ of the bend waveguide is a minus value, respectively.

The PLC-type DP-QPSK demodulator 1D has the following configurations.

(1) As shown in FIG. 9, in the demodulator 1D, the long PBS 30 in the first stage is formed at the central part of the PLC chip 3 in the shape of a rectangle substantially a square and the long PBSs 36, 37 in the second stage are formed in parallel with the PBS 30 sandwiched in between. Further, the 90-degree hybrid circuit 41 is arranged at the upper side of the PBS in the second stage (the second polarization beam splitter) 36 in FIG. 9 and the 90-degree hybrid circuit 42 at the lower side of the PBS in the second stage (the 3rd polarization beam splitter) 37 in FIG. 9, respectively.

(2) In order to make an attempt to downsize the PLC chip 3, a configuration is adopted, in which all the circuits of the PBSs 30, 36, 37 and the 90-degree hybrid circuits 41, 42 are arranged in a narrow region of the rectangular PLC chip 3.

Figure 10:
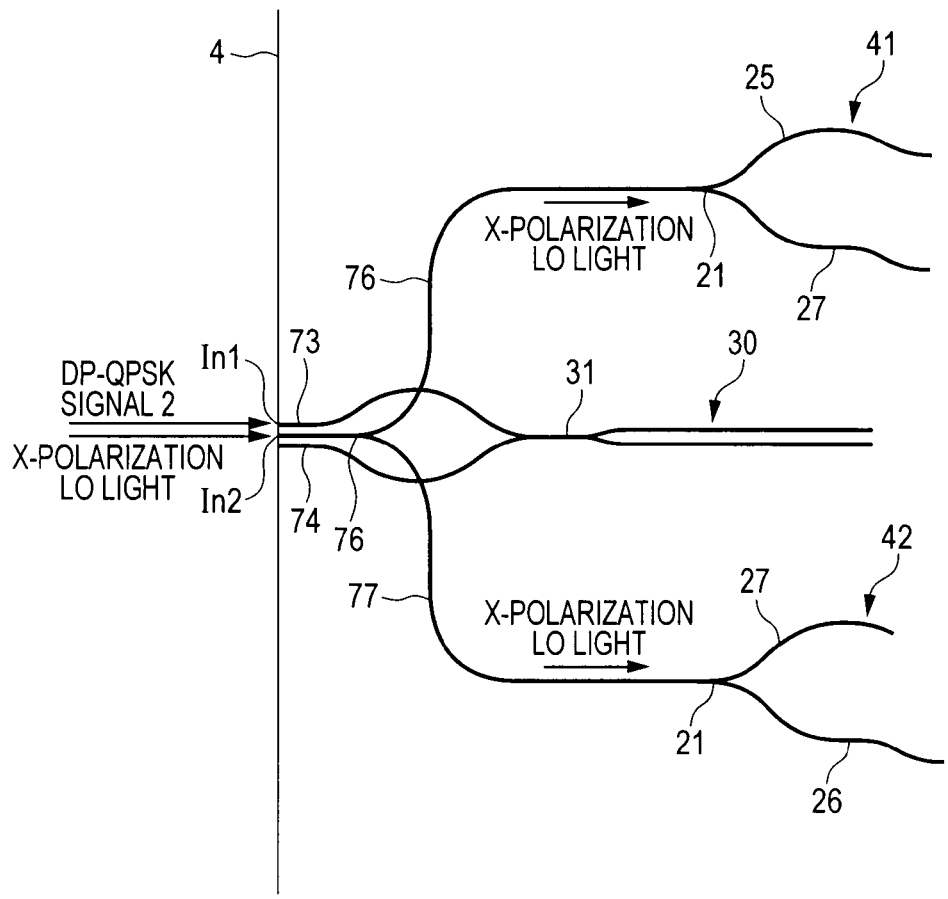
FIG. 10 is an enlarged view showing an input part of the PLC-type DP-QPSK demodulator shown in FIG. 9.

(3) As shown in FIG. 9 and FIG. 10, the X-polarization LO light incident on the input port In2 is branched into two parts by a Y-branch coupler 75 and caused to enter the coupler 21 on the input side of the 90-degree hybrid circuit 41 and the coupler 21 on the input side of the 90-degree hybrid circuit 42 through optical waveguides 76, 77, respectively. Here, the optical waveguides 76, 77 are formed so as to cause the X-polarization LO light branched into two by the Y-branch coupler 75 to enter the couplers 21, 21, respectively, on the input sides of the 90-degree hybrid circuits 41, by causing it to propagate in the rightward direction in FIG. 9 after causing it to propagate in the vertical direction in the diagram from the vicinity of the Y-branch coupler 75.

(4) As shown in FIG. 9 and FIG. 10, the DP-QPSK signal 2 incident on the input port In1 passes through an optical waveguide 73 that bypasses the Y-branch coupler 75 and is input to the coupler 31 on the input side of the PBS 30.

Figure 11:
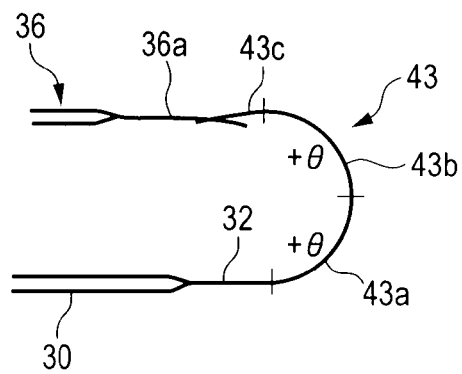
FIG. 11 is an explanatory diagram showing details of one of folded waveguides in the demodulator shown in FIG. 9.

(5) As shown in FIG. 9 and FIG. 11, the coupler 32 on the output side of the PBS 30 in the first stage and a coupler 36a on the input side of the PBS 36 in the second stage formed at the upper side thereof are connected by the folded waveguide 43 including bend waveguides, which have the absolute value of the total of the rotation angles the sign of which is not reversed being greater than 180 degrees, that is, the total of the rotation angles θ being greater than +180 degrees, from the output end of the optical function part (the coupler 32) on the side of the previous stage toward the input end of the optical function part (the coupler 36a) on the side of the post stage.

In the present specification, in the rectangular PLC chip 3, a direction in which light is incident on the input port is referred to as an x-direction (transverse direction in FIG. 9) and a direction vertical to the x-direction is referred to as a y-direction.

By setting the rotation angle θ of the folded waveguide 43 that combines a bend waveguide of +θ and a bend waveguide of −θ so that the absolute value of the total of the rotation angle the sign of which is not reversed from the output end of the optical function part on the side of the previous stage toward the input end of the optical function part on the side of the post stage to the following range, it is possible to suppress an increment of the PLC chip 3 in the y-direction. That is, it is possible to reduce the size of the PLC chip 3 in the vertical direction, that is, the size in direction in which the optical function parts are arranged side by side when each optical function part is integrated in parallel on the PLC.

$$180° \leq \theta \leq 270°$$

If the rotation angle θ is less than 180 degree, the amount of advancement of the folded waveguide 43 in the negative x-direction (in the leftward direction in FIG. 9) from the side of the output end 5 toward the side of the input end is small, and this is unfavorable. If the rotation angle θ exceeds 270°, the end point of the folded waveguide 43 does not advance in the upward direction in the diagram, that is, it advances to the opposite side of the optical function part on the side of the post stage arranged in parallel (the negative y-direction from the start point), and this is unfavorable.

The folded waveguide 43 includes a bend waveguide 43a of +90°, a bend waveguide 43b of +90°, and a bend waveguide 43c of several degrees in order from the side of the coupler 32 on the output side.

Figure 12:
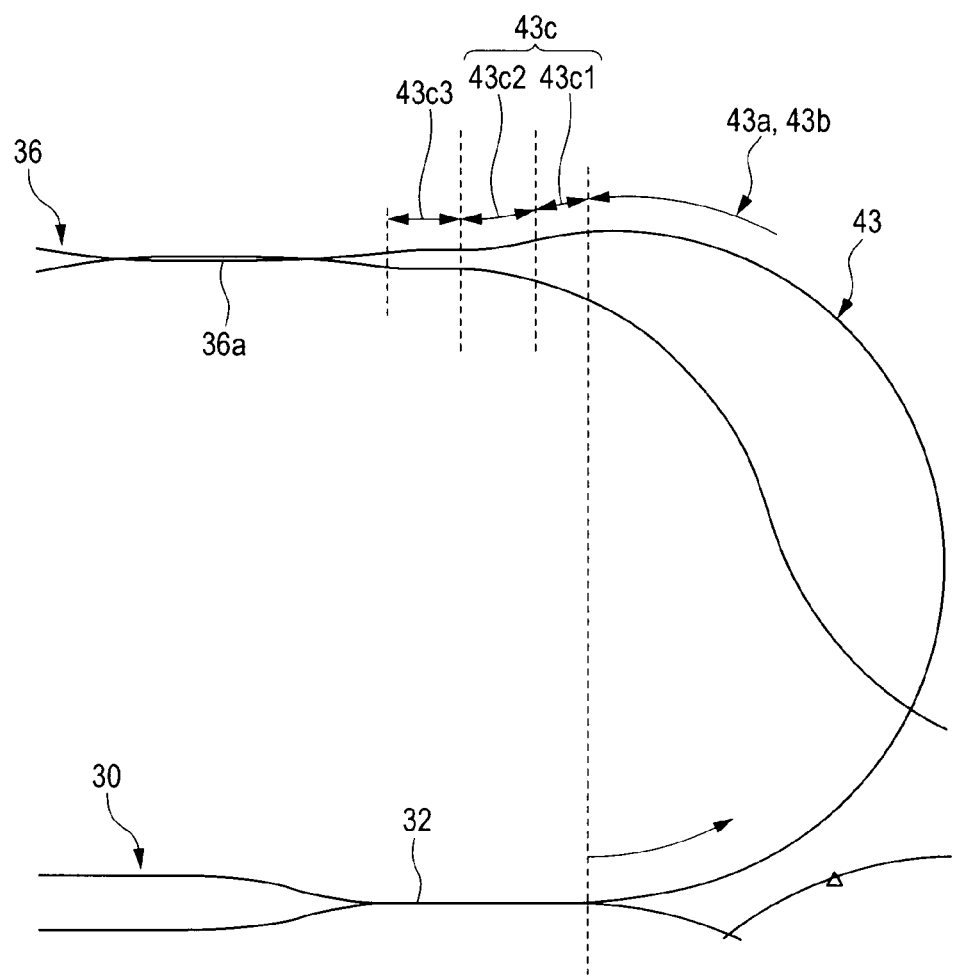
FIG. 12 is an enlarged view of FIG. 11.

As shown in FIG. 12, the bend waveguide 43c has a bend waveguide 43c1 of plus several degrees and a bend waveguide 43c2 of minus several degrees and the bend waveguide 43c2 is connected to the coupler 36a on the input side of the PBS 36 via a straight waveguide 43c3.

Due to this, it is possible to arrange the PBS 36 in the second stage in parallel and in the proximity so as to sandwich the PBS 30 in the first stage on the PLC chip 3 while securing a bend radius in such a degree that the loss due to leaked light is not problematic for each of the bend waveguides 43a, 43b, 43c.

Figure 13:
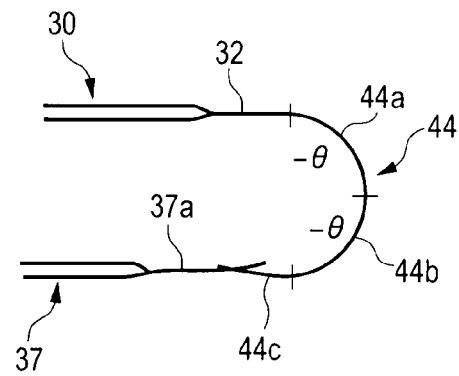
FIG. 13 is an explanatory diagram showing details of another folded waveguide in the demodulator shown in FIG. 9.

(6) As shown in FIG. 9 and FIG. 13, the coupler 32 on the output side of the PBS 30 in the first stage and a coupler 37a on the input side of the PBS 37 in the second stage formed in parallel at the lower part thereof in the diagram are connected by the folded waveguide 44 including bend waveguides, which have the absolute value of the total of rotation angles the sign of which is not reversed, that is, the total of the rotation angles θ being less than −180 degrees, from the output end of the optical function part (the coupler 32) on the side of the previous stage toward the input end of the optical function part (the coupler 37a) on the side of the post stage. In this case, the bends having a minus rotation angle (−θ) continue and the absolute value of the total of the rotation angles is greater than 180 degrees.

It is preferable to set the rotation angle θ of the folded waveguide 44 that combines a bend waveguide of −θ and a bend waveguide of +θ to the same range as that of the folded waveguide 43. The folded waveguide 44 includes a bend waveguide 44a of −90°, a bend waveguide 44b of −90°, and a bend waveguide 44c of several degrees in order from the side of the coupler 32 on the output side.

Figure 14:
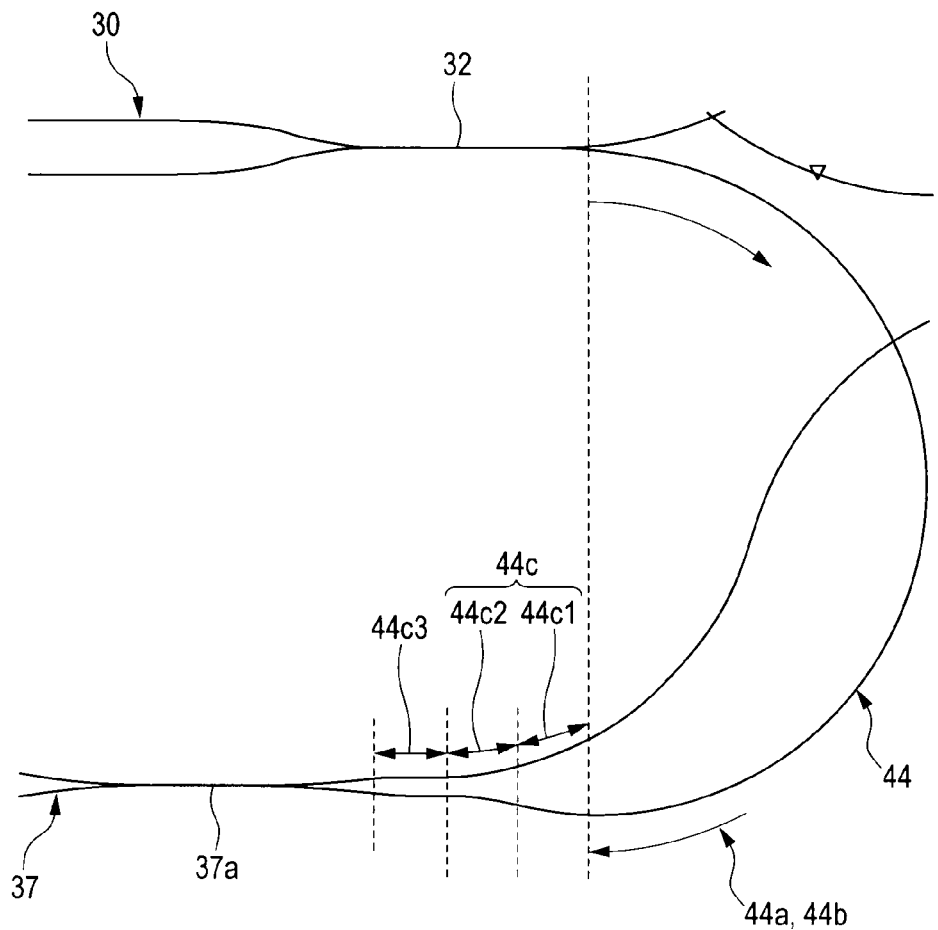
FIG. 14 is an enlarged view of FIG. 13.

As shown in FIG. 14, the bend waveguide 44c has a bend waveguide 44c1 of minus several degrees and a bend waveguide 44c2 of plus several degrees and the bend waveguide 44c2 is connected to the coupler 37a on the input side of the PBS 37 via a straight waveguide 44c3.

Due to this, it is possible to arrange the PBS 37 in the second stage in parallel and in the proximity so as to sandwich the PBS 30 in the first stage on the PLC chip 3 while securing a bend radius in such a degree that the loss due to leaked light is not problematic for each of the bend waveguides 44a, 44b, 44c.

Figure 15:
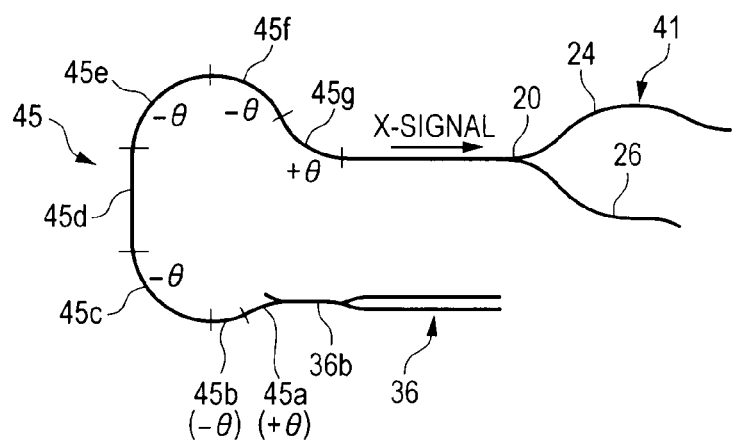
FIG. 15 is an explanatory diagram showing details of another folded waveguide in the demodulator shown in FIG. 9.

(7) As shown in FIG. 9 and FIG. 15, a coupler 36b on the output side of the PBS 36 in the second stage and the coupler 20 on the input side of the 90-degree hybrid circuit 41 formed at the upper part thereof (in the positive y-direction (in the upward direction in FIG. 9)) are connected by the folded waveguide 45 that combines bend waveguides of the plus rotation angle (+θ) and bend waveguides of the minus rotation angle (−θ), which have the absolute value of the total of rotation angles the sign of which is not reversed being greater than 180 degrees, from the output end of the optical function part (the coupler 36b) on the side of the previous stage toward the input end of the optical function part (the coupler 20) on the side of the post stage.

It is also preferable to set the rotation angle θ of the folded waveguide 45 that combines the bend waveguides of +θ and the bend waveguides of −θ to the same range as that of the bend waveguide 43. The folded waveguide 45 has a bend waveguide 45a of plus tens of degrees, a bend waveguide 45b of minus tens of degrees, a bend waveguide 45c of −90°, a straight waveguide 45d, a bend waveguide 45e of −90°, a bend waveguide 45f of about −45°, and a bend waveguide 45g of about +45° in order from the side of the coupler 36b on the output side. Due to this, it is possible to arrange the PBS 36 in the second stage and the 90-degree hybrid circuit 41 in parallel with and in the proximity of each other on the PLC chip 3 while securing a bend radius in such a degree that the loss due to leaked light is not problematic for each of the bend waveguides 45a, 45b, 45c, 45e, 45f, and 45g. To complement this, the folded waveguide 45 includes the straight waveguide 45d in the middle thereof, however, the rotation angle of the straight waveguide 45d is zero, and therefore, the sign of the angle θ is not reversed.

Further, the configuration is such that in which output light from the PBS 36 configured as the Mach-Zehnder interferometer passes through a cross port of the coupler 36b on the output side when viewed from the folded waveguide 43 and enters the folded waveguide 45. Due to this, it is possible to increase the extinction ratio of PBS and at the same time, to increase the bend radius of the folded waveguide 45.

Figure 16:
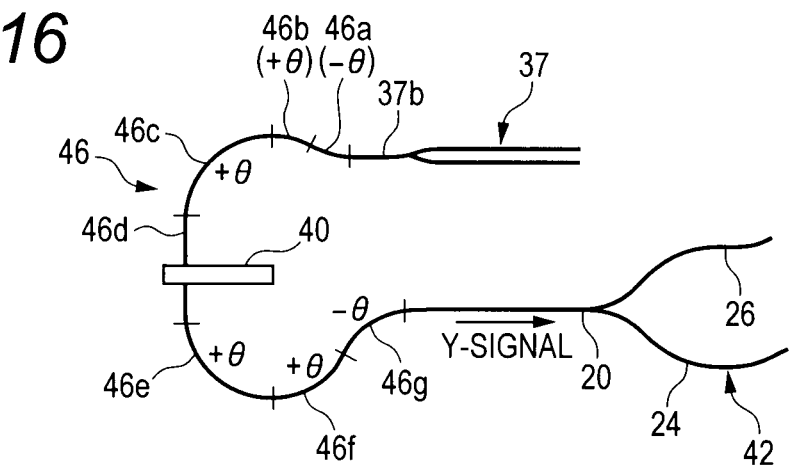
FIG. 16 is an explanatory diagram showing details of another folded waveguide in the demodulator shown in FIG. 9.

(8) As shown in FIG. 9 and FIG. 16, a coupler 37b on the output side of the PBS 37 in the second stage and the coupler 20 on the input side of the 90-degree hybrid circuit 42 formed at the lower part thereof (in the negative y-direction (in the downward direction in FIG. 9)) are connected by the folded waveguide 46 that combines bend waveguides of the plus rotation angle (+θ) and bend waveguides of the minus rotation angle (−θ), which have the total of rotation angles (the plus rotation angles θ) in the direction from the output end of the optical function part (the coupler 37b on the output side) on the side of the previous stage toward the input end of the optical function part (the coupler 20 on the input side) on the side of the post stage being greater than 180 degrees.

It is also preferable to set the rotation angle θ of the folded waveguide 46 that combines the bend waveguides of +θ and the bend waveguides of −θ to the same range as that of the bend waveguide 43. The folded waveguide 46 has a bend waveguide 46a of minus several degrees, a bend waveguide 46b of plus several degrees, a bend waveguide 46c of +90°, a straight waveguide 46d, a bend waveguide 46e of +90°, a bend waveguide 46f of about +45°, and a bend waveguide 46g of about −45° in order from the side of the coupler 37b on the output side. Due to this, it is possible to arrange the PBS 37 in the second stage and the 90-degree hybrid circuit 42 in parallel with and in the proximity of each other on the PLC chip 3 while securing a bend radius in such a degree that the loss due to leaked light is not problematic for each of the bend waveguides 46a, 46b, 46c, 46e, 46f, and 46g. To complement this, the folded waveguide includes the straight waveguide 46d in the middle thereof, however, the rotation angle of the straight waveguide 46d is zero, and therefore, the sign of the angle θ is not reversed.

Further, the configuration is such that in which output light from the PBS 37 configured as the Mach-Zehnder interferometer passes through a cross port of the coupler 37b on the output side when viewed from the folded waveguide 44 and enters the folded waveguide 46. Due to this, it is possible to increase the extinction ratio of PBS and at the same time, to increase the bend radius of the folded waveguide 46.

(9) The half-wavelength plate (λ/2 plate) 40 is inserted into the path through which one of signal light (each is modulated by independent information and hereinafter, referred to as the X-signal and the Y-signal) of each polarization component (X polarization and Y polarization) of the DP-QPSK signal 2 polarization-split in the PBS 30 propagates. Due to this, the X-signal and the Y-signal are caused to enter the 90-degree hybrid circuits 41, 42, respectively, in the same polarization state. In the present embodiment, as an example, the half-wavelength plate 40 is inserted into the straight waveguide 46d of the folded waveguide 46 through which the Y-signal polarization-split in the PBS 30 passes, and therefore, both the X-signal and the Y-signal are caused to enter the 90-degree hybrid circuits 41, 42, respectively, in the X-polarization state.

(10) For each of the folded waveguides 43, 44 and folded waveguide 47, 48, in order to set the radius of the bend waveguide to an optimum value, for example, 2,000 μm to 1,800 μm, the width of each bend waveguide is increased to, for example, 7 μm, respectively. At the end point of each folded waveguide, the width of the waveguide is converted into 6 μm again by a taper and the bend radius of the rest of the waveguide is set to 2,000 μm.

The reason for the above is to meet the demand that the separation between the output ports Out1, 2 and the output ports Out3, 4, the separation between the output ports Out3, 4 and the output ports Out5, 6, and the separation between the output ports Out 5, 6 and the output ports Out 7, 8 be the same (for example, a separation of 6 mm) within the limited size of the PLC chip 3.

(11) The configuration is set so that it is possible to cause light to enter inspection input ports P1, P4 of the PBSs 36, 37 in the second stage and to cause light to pass through only the PBSs 36, 37 and exit from inspection output ports P2, P3 for the inspection/adjustment of the PBSs 36, 37.

Specifically, as shown in FIG. 9, the inspection input port P1 is connected to one of the input ports of the coupler 36a on the input side. Further, as shown in FIG. 9 and FIG. 17, the through port of the coupler 36b on the output side of the PBS 36 and an optical waveguide 71 connected to the inspection output port P2 are connected by the folded waveguide 47 that combines bend waveguides of the plus rotation angle (+θ) and bend waveguides of the minus rotation angle (−θ), which have the total of the rotation angles (plus rotation angles θ) the sign of which is not reversed being greater than +180 degrees, from the output end of the optical function part (the coupler 36b) on the side of the previous stage toward the optical waveguide 71.

Figure 17:
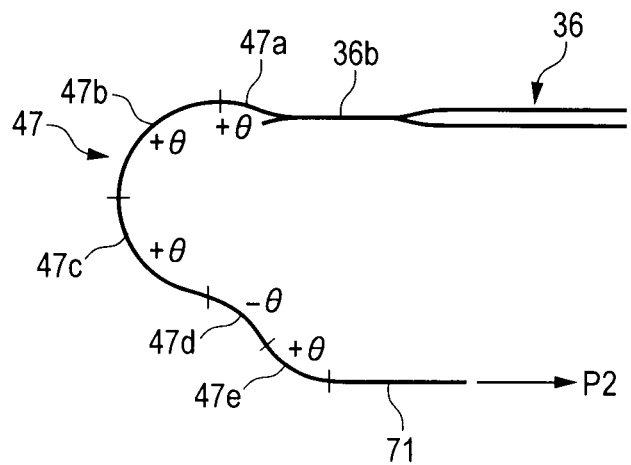
FIG. 17 is an explanatory diagram showing details of another folded waveguide in the demodulator shown in FIG. 9.

As shown in FIG. 17, the folded waveguide 47 has a bend waveguide 47a of plus tens of degrees, a bend waveguide 47b of +90°, a bend waveguide 47c of +90°, a bend waveguide 47d of about −45°, and a bend waveguide 47e of about +45° in order from the side of the coupler 36b. Due to this, it is possible to connect the PBS 36 and the optical waveguide 71 in parallel with each other in close positions while securing a bend radius in such a degree that the loss due to leaked light is not problematic for each of the bend waveguides 47a, 47b, 47c, 47d, and 47e.

Figure 18:
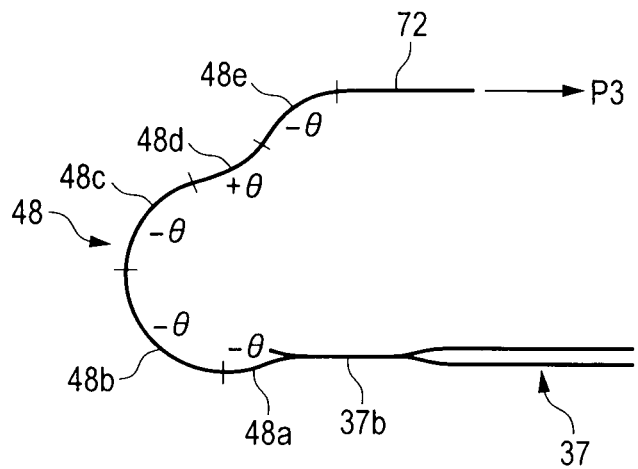
FIG. 18 is an explanatory diagram showing details of another folded waveguide in the demodulator shown in FIG. 9.

On the other hand, the inspection input port P4 is connected to one of the input ports of the coupler 37a on the input side of the PBS 37. Further, as shown in FIG. 9 and FIG. 18, the through port of the coupler 37b on the output side of the PBS 37 and an optical waveguide 72 connected to the inspection output port P3 are connected by the folded waveguide 48 that combines bend waveguides of the plus rotation angle (+θ) and bend waveguides of the minus rotation angle (−θ), which have the absolute value of the total of the rotation angles θ the sign of which is not reversed being greater than 180 degrees, from the output end of the optical function part (the coupler 37b) on the side of the previous stage toward the optical waveguide 72. The optical waveguide 72 is bent and extends as the optical waveguide 71 in a position close to the optical waveguide 71.

As shown in FIG. 18, the folded waveguide 48 has a bend waveguide 48a of several degrees, a bend waveguide 48b of −90°, a bend waveguide 48c of −90°, a bend waveguide 48d of about +45°, and a bend waveguide 48e of about −45° in order from the side of the coupler 37b on the output side. Due to this, it is possible to connect the PBS 37 and the optical waveguide 72 in parallel with each other in close positions while securing a bend radius in such a degree that the loss due to leaked light is not problematic for each of the bend waveguides 48a, 48b, 48c, 48d, and 48e.

In each of the Mach-Zehnder interferometers constituting the PBSs 30, 36, 37, a heater is disposed in at least one of the upper and lower arms. By adjusting the voltage to be applied to the heater and controlling the refractive index and the amount of birefringence of the waveguide independently, it is made possible to make an adjustment so that the polarization extinction ratio is a desired value as the PBS. At that time, it is possible to adjust only the PBS 36 by causing light to enter from P1 and measuring the light output from P2. Further, it is possible to adjust only the PBS 37 by causing light to enter from P4 and measuring the light output from P3. It may be also possible to exchange input/output of P1 and P2 and also to exchange input/output of P3 and P4. After the adjustment of the PBS 36 is completed, by causing light to enter from P2 and measuring the light output from In1 or In2, it is possible to adjust the PBS 30. Alternatively, after the adjustment of the PBS 37 is completed, by causing light to enter from P3 and measuring the light output from In1 or In2, it is also possible to adjust the PBS 30.

Other configurations in the demodulator 1D are the same as those in the demodulator 1 according to the first embodiment.

According to the fifth embodiment having the above configuration, the following technical advantages are obtained in addition to the technical advantages achieved in the first embodiment.

By the above configurations (1), (2), it is possible to make an attempt to downsize the PLC chip 3 and to realize a compact PLC-type DP-QPSK demodulator.

By the above configurations (5) to (8), it is possible to arrange the PBSs 36, 37 and the two 90-degree hybrid circuits 41, 42 in parallel with and in the proximity of each other in the PLC chip 3 while securing a bend radius in such a degree that the loss due to leaked light is not problematic for each bend waveguide. Consequently, it is possible to realize a compact PLC-type DP-QPSK demodulator without deteriorating the optical characteristic. By the above configuration (11), it is possible to independently adjust a plurality of PBSs integrated on one PLC.

By arranging the PBS 30 and the long PBSs 36, 37 in close positions on the PLC chip 3, it is possible to realize a high-performance PLC-type DP-QPSK demodulator that reduces the skew between the X-signal and the Y-signal.

Further, the characteristics of the waveguides (for example, the operation as an interferometer) become close to one another, and therefore, the labor and time required for adjustment can be omitted. That is, when a plurality of Mach-Zehnder interferometers exits on the PLC chip 3, if the values of their refractive indexes are the same, the interferometers having the same arm-to-arm optical path difference (physical length) exhibit the same interference conditions (the value of FSR, the wavelength that gives the peak value of the transmission function, etc.), and therefore, labor and time required for adjustment can be omitted.

Further, the configuration is such that light passes through the cross ports, respectively, of the couplers 36b, 37b on the output side of the PBSs 36, 37 when viewed from the input side waveguides 43 and 44 and enters the folded waveguides 45, 46. Due to this, it is possible to increase the extinction ratio of PBS and at the same time, to increase the bend radius of the folded waveguides 45, 46, respectively.

As described above, according to the present embodiment, the polarization beam splitter, the 90-degree hybrid circuit, and the polarization beam splitters in the first stage and the second stage formed respectively in parallel on the rectangular PLC chip are connected by bend waveguides as a folded waveguide, which have the absolute value of the total of the rotation angles the sign of which is not reversed being greater than 180 degrees, from the output end of the optical function part on the side of the previous stage toward the input end of the optical function part on the side of the post stage. Due to this, it is possible to arrange a plurality of polarization beam splitters and two 90-degree hybrid circuits in parallel with and in the proximity of one another while securing a bend radius in such a degree that the loss due to leaked light is not problematic for each bend waveguide. Consequently, it is possible to realize a compact PLC-type DP-QPSK demodulator without deteriorating the optical characteristics.

(PLC-Type DP-QPSK Demodulator According to Sixth Embodiment)

Figure 19:
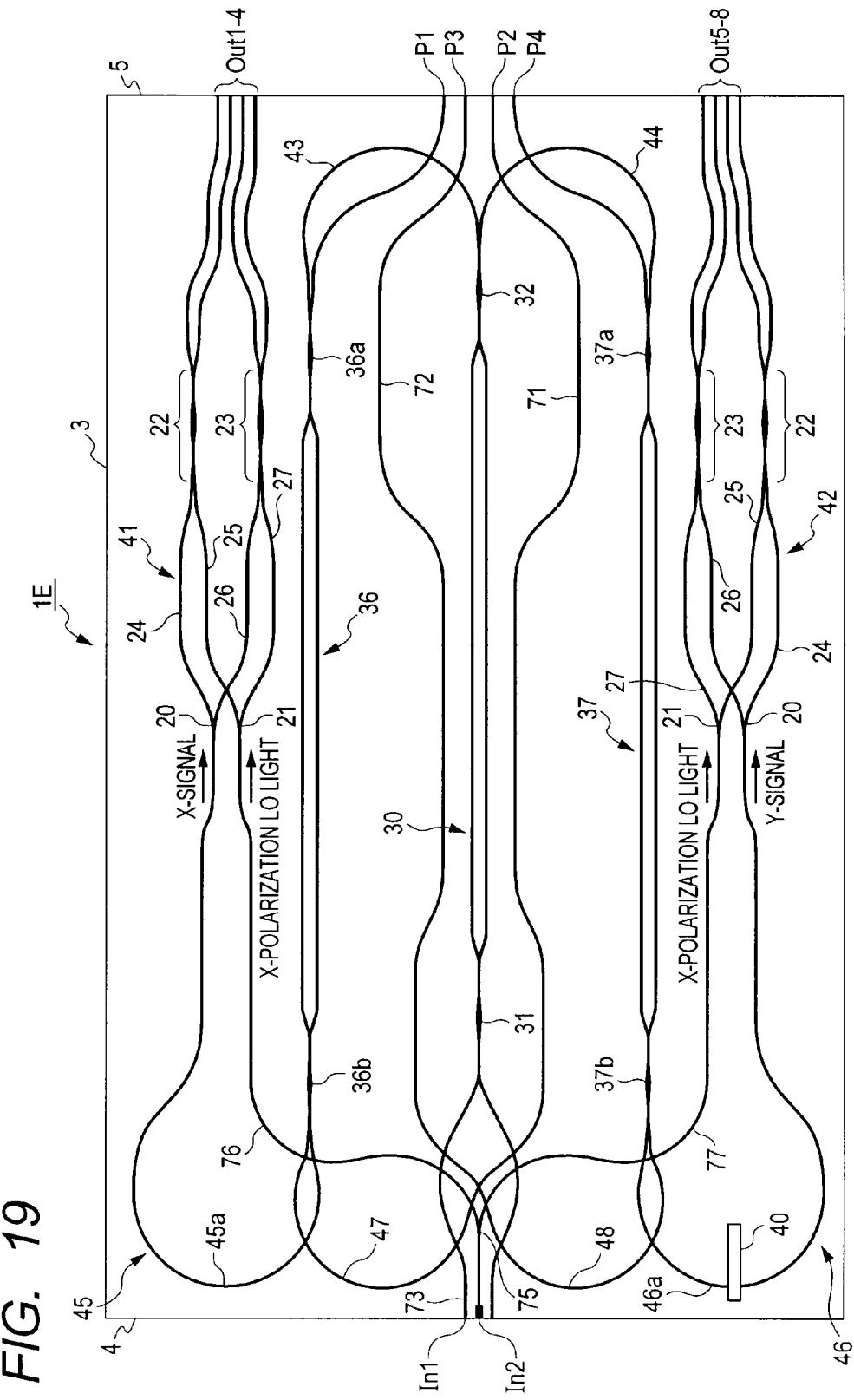
FIG. 19 is a block diagram showing a basic configuration of a PLC-type DP-QPSK demodulator according to a sixth embodiment of the present invention.

FIG. 19 shows a basic configuration of a PLC-type DP-QPSK demodulator 1E according to a sixth embodiment. The main different point between the demodulator 1E and the demodulator 1D shown in FIG. 9 lies in the following configuration.

(1) A bent taper is used to turn parts of the folded waveguides 45, 46 into the wide waveguides 45a, 46a for a wavelength plate slit, respectively. The bent taper is a portion where each of the wide waveguides 45a, 46a bends upward/downward in the diagram. The "bent taper" here means a waveguide that converts the width while bending, that is, a waveguide the width of which varies.

(2) In order to reduce the longitudinal size of the PLC chip 3, at the output end 5, the eight output ports Out1 to 4 and Out5 to 8 are respectively arranged integrally.

(3) Light incident from the inspection port P1 passes through the PBS 36 and then passes through the folded waveguide 47 and the optical waveguide 71, and then, is output from the inspection port P2. On the other hand, light incident from the inspection port P4 passes through the PBS 37 and then passes through the folded waveguide 48 and the optical waveguide 72, and then, is output from the inspection port P3. In this manner, in the present embodiment, one of the optical waveguides 71, 72 is formed at the upper side of the PBS 30 (in the positive y-direction (in the upward direction in FIG. 19)) and the other is formed at the lower side of the PBS 30 (in the negative y-direction (in the downward direction in FIG. 19)).

As described above, the present invention is characterized by using bend waveguides, which have the absolute value of the total of the rotation angles the sign of which is not reversed being greater than 180 degrees, from the output end of the optical function part (coupler) on the side of the previous stage toward the optical function part (coupler) on the side of the post stage when integrating a plurality of optical function parts in parallel on one PLC. Due to this, the configuration is such that after the bend waveguides are caused to bulge out excessively to the side of the optical function parts on the side of the previous stage and/or the side of the post stage and then part thereof is returned, and therefore, the degree of freedom of the separation between the optical function parts integrated in parallel on the side of the previous stage and the side of the post stage and the arrangement of each optical function part in the lengthwise direction is improved and it is possible to realize downsizing of an optical integrated circuit.

Further, by making the absolute value of the total of the rotation angles by which the bend waveguides are bent successively in one direction greater than 180 degrees, it is possible to realize downsizing of an optical integrated circuit more effectively.

It is desirable for a bend waveguide used in the present invention to have a fixed curvature radius in such a degree that the excessive loss due to bending is not problematic.

However, the wording "the sign is not reversed", "bending in one direction", etc., in the present invention do not exclude a small difference that does not affect downsizing of an optical integrated circuit and should be accepted appropriately based on the gist of the present invention.

(PLC-Type DP-QPSK Demodulator According to Seventh Embodiment)

Figure 21:
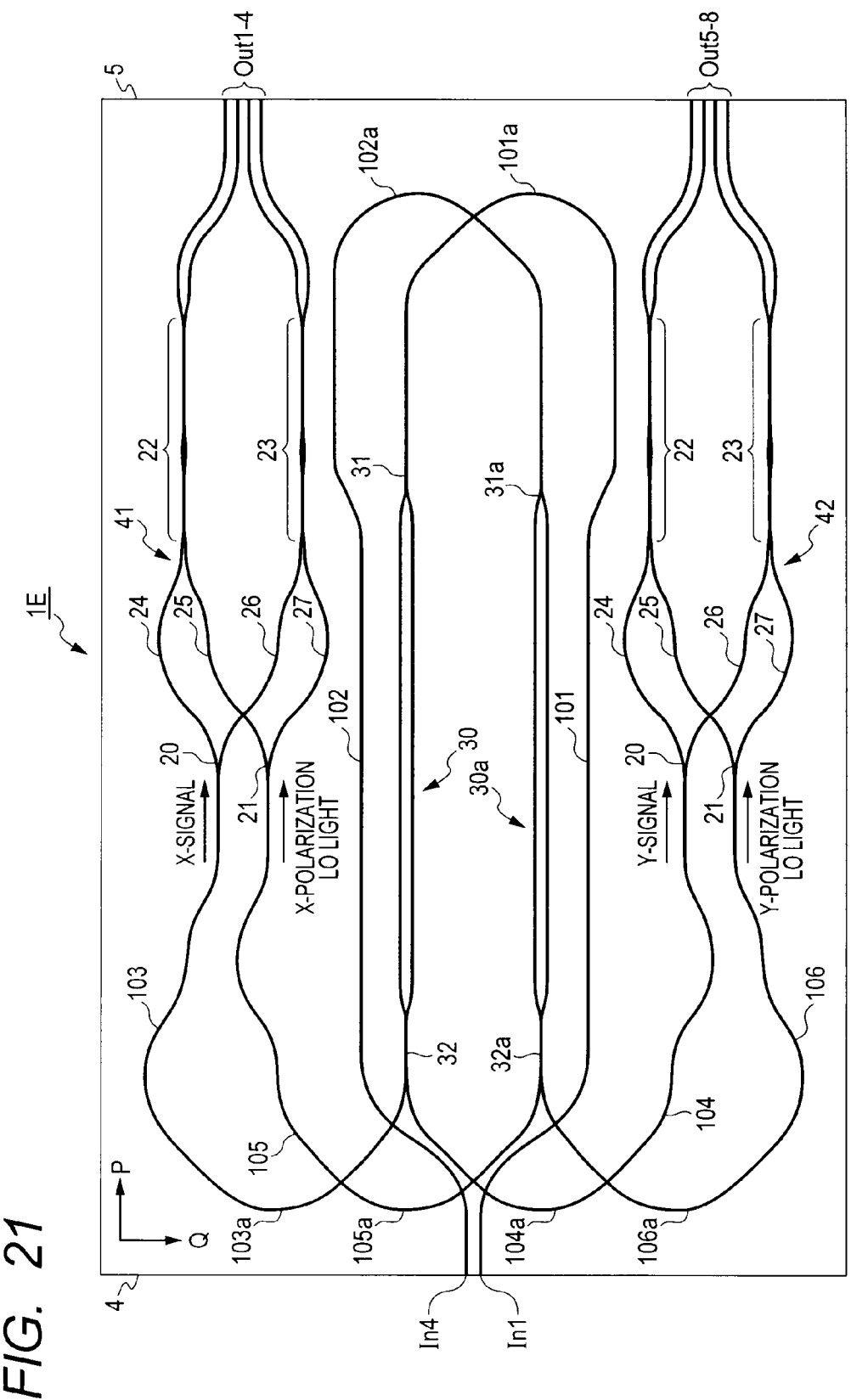
FIG. 21 is a block diagram showing a basic configuration of a PLC-type DP-QPSK demodulator according to a seventh embodiment of the present invention.

FIG. 21 shows a basic configuration of a PLC-type DP-QPSK demodulator according to a seventh embodiment.

In the demodulator 1E according to the present embodiment, the path through which an input QPSK signal and LO light enter the 90-degree hybrid circuit is folded twice and between a region folded for the first time (region where the input light (QPSK signal and LO light) is changed to the opposite side of the input direction) and a region folded for the second time (region where the light traveling on the opposite side is changed again to the input direction), PBSs for the QPSK signal and LO light are provided, respectively. Then, the structure of the second time folded region is devised so that the optical path length for the X-signal (X-polarization QPSK signal) from the PBS to the 90-degree hybrid circuit and the optical path length for the Y-signal (Y-polarization QPSK signal) from the PBS to the 90-degree hybrid circuit are at least the same.

In FIG. 21, at the input end 4 of the demodulator 1E, the input port In1 of the DP-QPSK signal as a polarization-multiplexed coherent modulated signal and an input port In4 to input both the X-polarization LO light and the Y-polarization LO light are provided. Further, at a predetermined distance apart from the input end 4, the PBS 30 to split the DP-QPSK signal into the X-signal and the Y-signal and a PBS 30a to split the X-polarization and Y-polarization multiplexed LO light (light that mixes the X-polarization LO light and the Y-polarization LO light) into the X-polarization LO light and the Y-polarization LO light are provided. That is, the PBS 30 and the PBS 30a are arranged in parallel at the same distance apart from the input end 4, respectively. The PBS 30a has the same structure as that of the PBS 30 shown in FIG. 2 and is a Mach-Zehnder interferometer (MZI) having the two couplers 31a, 32a and two arm waveguides connected between both the couplers 31a, 32a.

In the post stage of the input port In1, a waveguide 101 having a first folded region 101a and connecting the input port In1 and the coupler 31 of the PBS 30 (the input side coupler of the PBS 30) is provided and in the post stage of the input port In4, a waveguide 102 having a first folded region 102a and connecting the input port In4 and the coupler 31a of the PBS 30a (the input side coupler of the PBS 30a) is provided. On the side of the post stage in the direction of the propagation of the QPSK signal (X-signal) of the PBS 30, the 90-degree hybrid circuit 41 is provided and on the side of the post stage in the direction of the propagation of the QPSK signal (Y-signal) of the PBS 30a, the 90-degree hybrid circuit 42 is provided.

The coupler 32 of the PBS 30 (the output side coupler of the PBS 30) and the Y-branch coupler 20 of the 90-degree hybrid circuit 41 are connected by a waveguide 103 having a second folded region 103a and the coupler 32 of the PBS 30 and the Y-branch coupler 20 of the 90-degree hybrid circuit 42 are connected by a waveguide 104 having a second folded region 104a. Further, the coupler 32a of the PBS 30a (the output side coupler of the PBS 30a) and the Y-branch coupler 21 of the 90-degree hybrid circuit 41 are connected by a waveguide 105 having a second folded region 105a and the coupler 32a of the PBS 30a and the Y-branch coupler 21 of the 90-degree hybrid circuit 42 are connected by a waveguide 106 having a second folded region 106a.

In FIG. 21, along the direction of an arrow Q perpendicular to the direction of an arrow P from the input end 4 toward the output end 5 in opposition to the input end 4, the 90-degree hybrid circuit 41, the PBS 30, the PBS 30a, and the 90-degree hybrid circuit 42 are arranged in this order. Consequently, the waveguide 103 for the X-signal to propagate intersects the waveguide 105 for the X-polarization LO light to propagate and the waveguide 104 for the Y-signal to propagate intersects the waveguide 105 and the waveguide for the Y-polarization LO light to propagate.

The main different point between the demodulator 1E and the demodulator 1D shown in FIG. 9 lies in the following configuration. First, in the modulator 1E, the PBS 30 for signal light is configured by a MZI in one stage. Further, the PBS 30a for LO light is also configured by a MZI in one stage and integrated on the PLC chip 3. The arrangement of the input waveguide and the folded waveguide of the signal light and LO light, and the PBS has a configuration axisymmetric with respect to the direction of the arrow P (transverse direction) from the input end 4 toward the output end 5 in opposition to the input end 4. Further, by configuring the four waveguides 103 to 106 after exiting the PBSs 30, 30a into the configuration (details will be described later) in FIG. 22, the four waveguides through which the X-polarization component (X-signal) and the Y-polarization component (Y-signal) of the signal light (QPSK signal) and the X-polarization component and the Y-polarization component of the LO light propagate are folded in a symmetric form. Consequently, it is possible to reduce the occurrence of skew and to guide the polarization components to the two 90-degree hybrid input ports corresponding to the polarization components, respectively. This configuration enables a folded configuration in which the occurrence of skew is reduced and further contributes greatly to downsizing in chip size (in particular, in the transverse direction).

In the present embodiment, in order to reduce the occurrence of skew as described above, the optical path length of the path (the waveguide 103) for X-signal between the PBS 30 and the 90-degree hybrid circuit 41 and that of the path (the waveguide 104) for Y-signal between the PBS 30 and the 90-degree hybrid circuit 42 are made the same. Further, the optical path length of the path (the waveguide 105) for X-polarization LO light between the PBS 30a and the 90-degree hybrid circuit 41 and that of the path (the waveguide 106) for Y-polarization LO light between the PBS 30a and the 90-degree hybrid circuit 42 are also made the same. In order to realize the above, the present embodiment is characterized in the structure of the second folded region as shown in FIG. 22.

Figure 22:
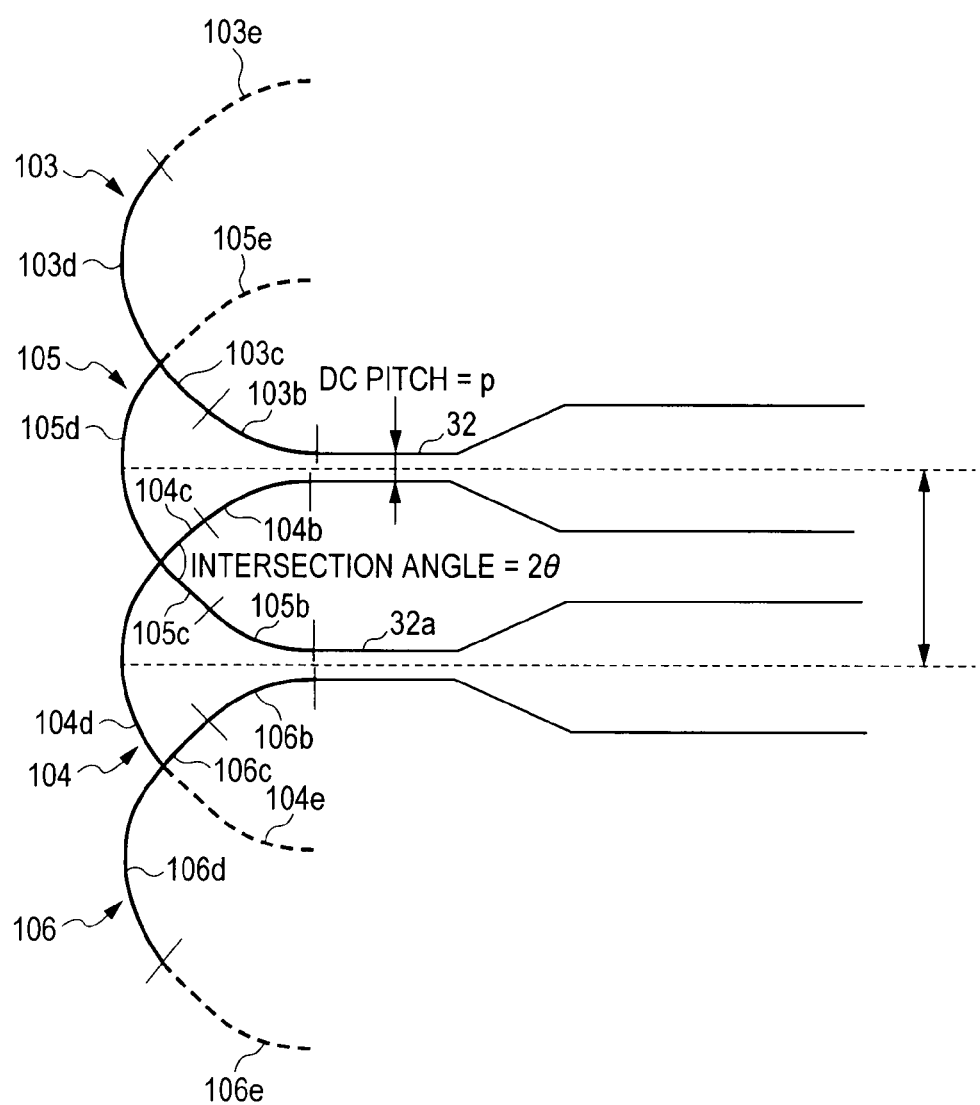
FIG. 22 is a diagram for explaining a configuration of a second folded region of the PLC-type DP-QPSK demodulator shown in FIG. 21.

FIG. 22 is a diagram for explaining the configuration of the second folded region of the waveguides 103 to 106. In FIG. 22, the waveguide 103 has a bend waveguide (bend waveguide of the rotation angle +θ) 103b the same shape as a fan-shaped arc of the bend radius r and a central angle θ, a straight waveguide 103c of a predetermined length l, a bend waveguide (bend waveguide of a rotation angle +(π−2θ)) 103d the same shape as a fan-shaped arc of the bend radius r and a central angle (π−2θ)), and a remaining waveguide 103e. The waveguide 104 has a bend waveguide (bend waveguide of a rotation angle −θ) 104b the same shape as a fan-shaped arc of the bend radius r and the central angle θ, a straight waveguide 104c of the predetermined length l, a bend waveguide (bend waveguide of a rotation angle −(π−2θ)) 104d the same shape as a fan-shaped arc of the bend radius r and the central angle (π−2θ)), and a remaining waveguide 104e. The waveguide 105 has a bend waveguide 105b of the rotation angle +θ, a straight waveguide 105c of the predetermined length l, a bend waveguide 105d of the rotation angle +(π−2θ), and a remaining waveguide 105e. Further, the waveguide 106 has a bend waveguide 106b of the rotation angle −θ, a straight waveguide 106c of the predetermined length l, a bend waveguide 106d of the rotation angle −(π−2θ), and a remaining waveguide 106e.

As described above, the shape of the waveguide 103 from the bend waveguide 103b to the bend waveguide 103d and the shape of the waveguide 105 from the bend waveguide 105b to the bend waveguide 103d are the same and the shape of the waveguide 104 from the bend waveguide 104b to the bend waveguide 104d and the shape of the waveguide 106 from the bend waveguide 106b to the bend waveguide 106d are the same. Further, the shape of the waveguide 103 from the bend waveguide 103b to the bend waveguide 103d and the shape of the waveguide 104 from the bend waveguide 104b to the bend waveguide 104d are axisymmetric with respect to the direction of the arrow P.

In the present embodiment, the waveguide 104, which is the path from the PBS 30 toward the 90-degree hybrid circuit 42, and the waveguide 105, which is the path from the PBS 30a toward the 90-degree hybrid circuit 41, intersect with each other at the boundary between the straight waveguide 104c and the bend waveguide 104d and the boundary between the straight waveguide 105 and the bend waveguide 105d and form an intersection angle 2θ. It is assumed that the distance (DC pitch) between two waveguides arranged in the proximity of each other in the couplers 32, 32a is p. At this time, if the line length l is determined as follows, it is possible to make the same the shapes of the four waveguides 103, 104, 105, 106 as described above, and to make 2θ all the intersection angles when the waveguide 103 intersects the waveguide 105, the waveguide 105 intersects the waveguide 104, and the waveguide 104 intersects the waveguide 106.

First, the distance along the direction of the arrow Q from the central line of the PBS 30, that is, the central line (both are lines parallel with the arrow p in FIG. 21) to the point where the straight waveguide 104c and the straight waveguide 105c intersect with each other is p/2+r(1−cos θ)+l sin θ. What is required is to cause this length to agree with r sin(π/2−θ)=r cos θ, the distance along the direction of the arrow Q of the first half part of the bend waveguide 105d of the rotation angle −(π−2θ), that is the bend waveguide of the rotation angle −(π/2−θ). From this, $$p/2+r(1-\cos \theta)+l \sin \theta = r \cos \theta \quad (1)$$

holds and from the expression (1),

[Mathematical expression 1]

$$l=(2r \cos \theta - r - p/2)/\sin \theta \quad (2)$$

is obtained.

As described above, it is also possible to uniquely determine the length l of the straight waveguides 103c, 104c, 105c, 106c by determining the bend radius r and the angle θ. That is, the bend waveguides 103b, 104b, 105b, 106b located in the previous stage of the straight waveguides 103c, 104c, 105c, 106c correspond to the arc on the sector side in the same shape and the bend waveguides 103d, 104d, 105d, 106d located in the post stage of the straight waveguides 103c, 104c, 105c, 106c also correspond to the arc on the sector side in the same shape. Because of this, by finding the length l of each of the straight waveguides 103c, 104c, 105c, 106c according to the expression (2), it is possible to make the same the optical path lengths of the straight waveguides 103c, 104c, 105c, 106c and as a result of that, it is possible to at least make the same shape or an axisymmetric shape up to the regions where the waveguide is folded (the waveguide 103; the bend waveguide 103b, the straight waveguide 103c, the bend waveguide 103d, the waveguide 104; the bend waveguide 104b, the straight waveguide 104c, the bend waveguide 104d, the waveguide 105; the bend waveguide 105b, the straight waveguide 105c, the bend waveguide 105d, the waveguide 106; the bend waveguide 106b, the straight waveguide 106c, the bend waveguide 106d) of the waveguides 103 to 106. Because of this, it is possible to make the same the optical path lengths of the regions where the waveguide is folded of the waveguides 103 to 106.

As to the remaining waveguides 103e, 104e, 105e, 106e, the paths after the waveguide is folded, it is not necessary to make their shapes the same, however, the optical path lengths up to the 90-degree hybrid circuit (corresponding Y-branch coupler) are set the same.

Consequently, it is possible to make the same the optical path lengths of the waveguides 103 to 106 and to reduce the occurrence of skew.

An example of a method of designing the waveguides 103 to 106 in the present embodiment is explained. In accordance with the specifications of the demodulator, the curvature radii r of the bend waveguides 103b, 104b, 105b, 106b and the bend waveguides 103d, 104d, 105d, 106d are determined and the DC pitch p of the couplers 32, 32a is determined. The bend radii of the bend waveguides 103b, 104b, 105b, 106b and the bend waveguides 103d, 104d, 105d, 106d are the same value. Next, the intersection angle 2θ of the waveguide 104 and the waveguide 105 is determined. For example, when it is desired to make the loss due to the intersection of the waveguides 104, 105 a minimum, the intersection angle 2θ is set to 90 degrees.

When the intersection angle 2θ is determined in this manner, the shapes of the bend waveguides 103b, 104b, 105b, 106b (the rotation angle θ) and the bend waveguides 103d, 104d, 105d, 106d (the rotation angle (π−2θ)) are determined because the bend radii r of the respective bend waveguides are determined. By substituting the bend radius r, the DC pitch p, and the angle θ into the expression (2), it is possible to determine the lengths l of the straight waveguides 103c, 104c, 105c, 106c and the shapes of the straight waveguides 103c, 104c, 105c, 106c are determined.

As described above, in the present embodiment, the intersection angle is included in the design parameters of the straight waveguides and the bend waveguides in the previous stage and the post stage of the straight waveguides, and therefore, it is possible to easily design the structure according to the intersection angle, in which the folding of the waveguide is realized and the optical path lengths of the waveguide portions that realize the folding are made the same.

The absolute value of the rotation angles of the bend waveguides 103d, 104d, 105d, 106d is limited to (π−2θ). The reason is that when the absolute value of the rotation angle exceeds (π−2θ), the excess portion may be regarded to be included in the remaining waveguides 103e, 104e, 105e, 106e and conversely, when the absolute value of the rotation angle is less than (π−2θ), it is not possible to set the intersection angle at which the bend waveguide 105d and the bend waveguide 103d intersect with each other (or the bend waveguide 105d and the straight waveguide 103c intersect with each other) to 2θ and similarly, it is not possible to set the intersection angle at which the bend waveguide 104d and the bend waveguide 106d intersect with each other (or the bend waveguide 104d and the straight waveguide 106c intersect with each other) to 2θ.

(PLC-Type DP-QPSK Demodulator According to Eighth Embodiment)

Figure 23:
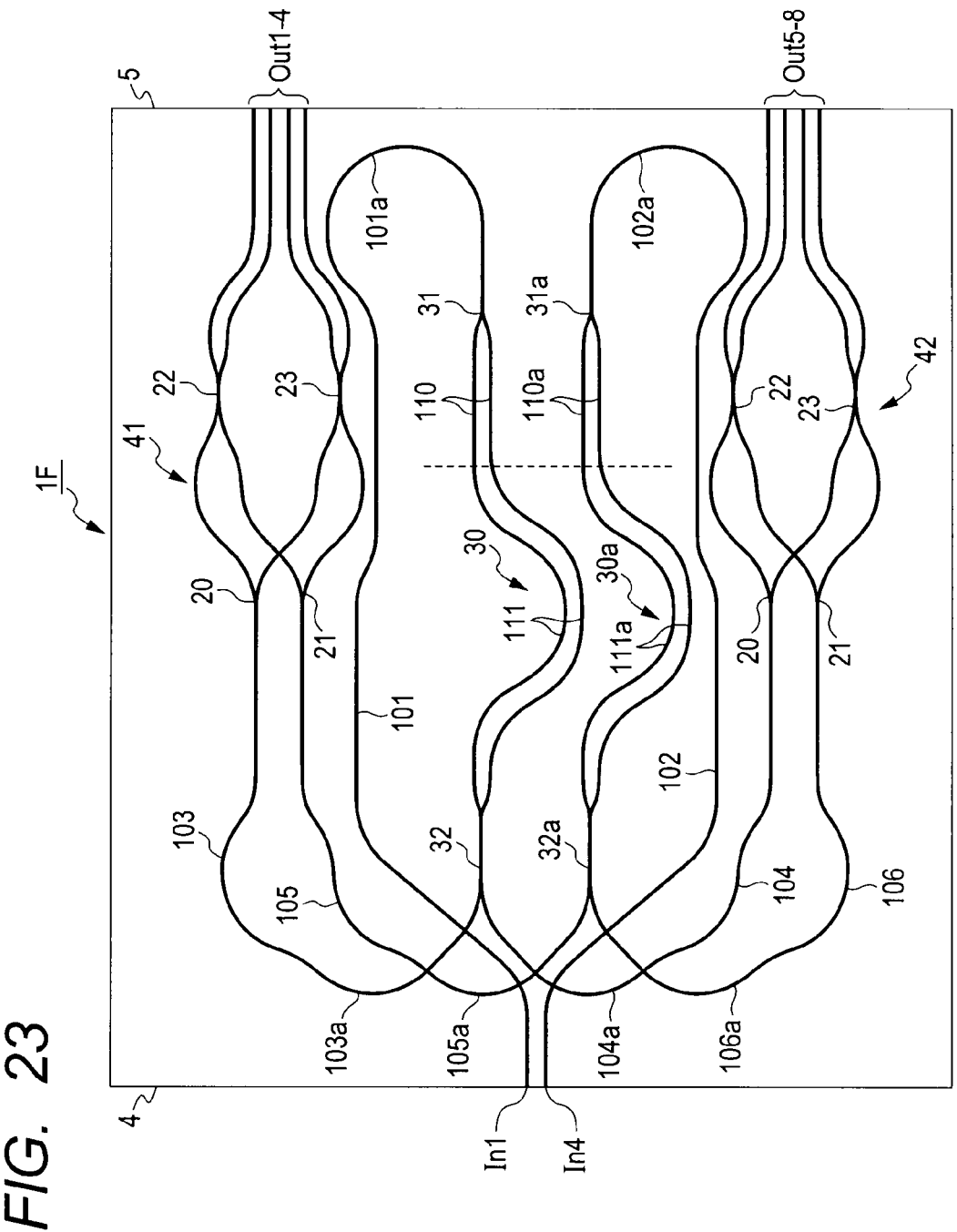
FIG. 23 is a block diagram showing a basic configuration of a PLC-type DP-QPSK demodulator according to an eighth embodiment of the present invention.

FIG. 23 shows a basic configuration of a PLC-type DP-QPSK demodulator according to an eighth embodiment.

A demodulator 1F shown in FIG. 23 has the same basic structure as that of the demodulator 1E according to the seventh embodiment shown in FIGS. 21, 22, however, the specific refractive index difference between the core and cladding of the waveguide is set to, as an example, 1.2% in the case of the demodulator 1E and 1.8% in the case of the demodulator 1F shown in FIG. 23. Because of this, it is possible to reduce the bend radius of the bend waveguide from 2 mm to 1.2 mm. As a result of that, it is possible to reduce the transverse length of the demodulator 1F of the present embodiment to 15 mm and the longitudinal length to 13 mm while the transverse length (the length in the direction of the arrow P in FIG. 21) of the demodulator 1E is 25 mm and the longitudinal length (the length in the direction of the arrow Q in FIG. 21) is 16 mm.

Figure 24:
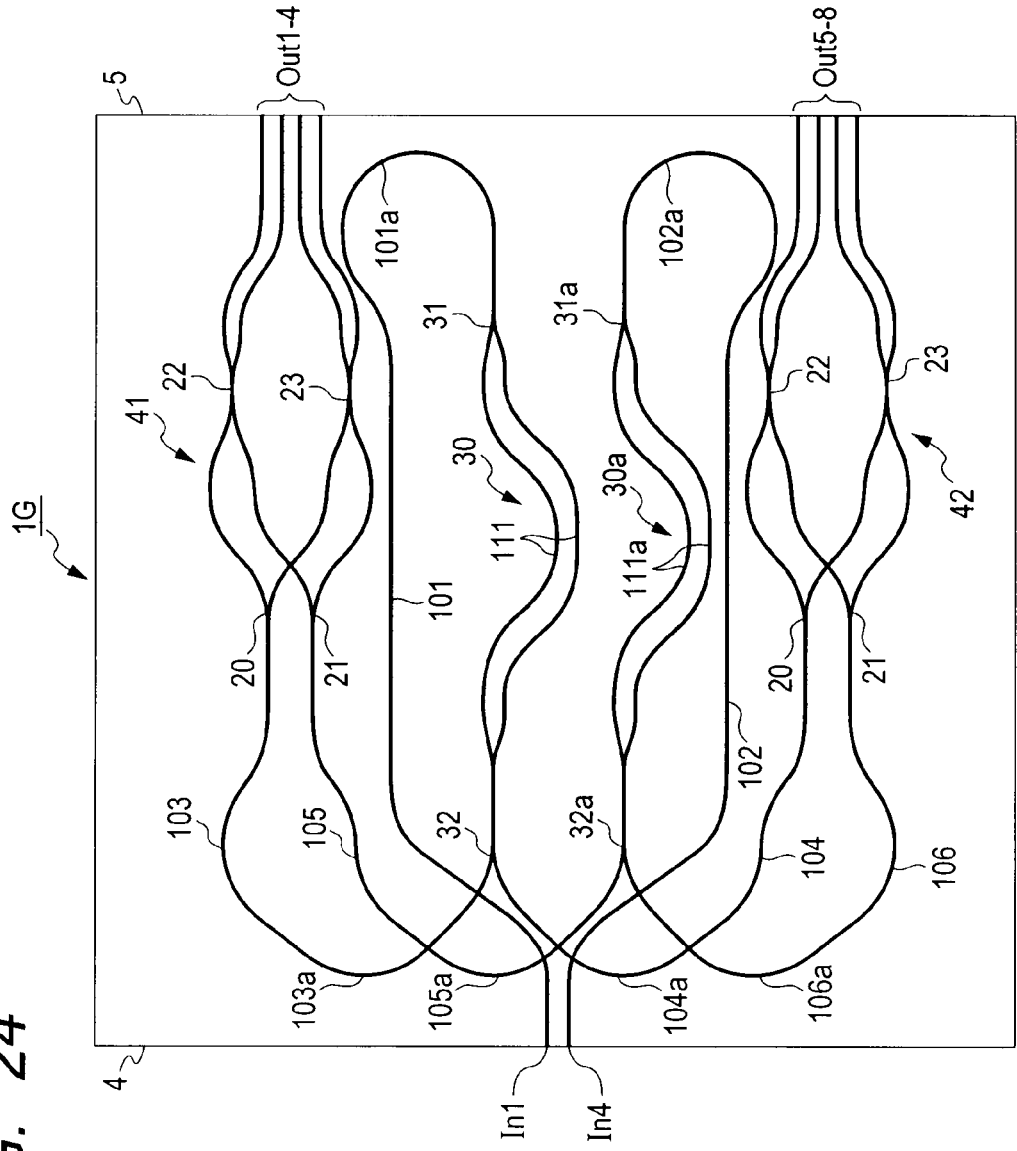
FIG. 24 is a block diagram showing a basic configuration of a PLC-type DP-QPSK demodulator according to the eighth embodiment of the present invention.

In the present embodiment, a bent part is provided in the PBSs 30, 30a, and therefore, a heater to be formed is also bent. Consequently, as shown in FIG. 23, on the arm waveguide of the PBS 30, a heater 110 in a straight shape and a heater 111 in a bent shape are formed and on the arm waveguide of the PBS 30a, a heater 111a in a straight shape and a heater 110a in a bent shape are formed. By bending the heater, it is possible to reduce the size in the transverse direction compared to the case where the heater of equal length is not bent. A demodulator 1G in which the heaters 110, 110a in the straight shape in the demodulator 1F are omitted in order to make an attempt to further reduce the size is shown in FIG. 24. With the demodulator 1G shown in FIG. 24, it is possible to further reduce the chip size by omitting the heaters 110, 110a in the straight shape and to realize the size of 12 mm for both the longitudinal and the transverse directions.

<Optical Transmission System>

Figure 20:
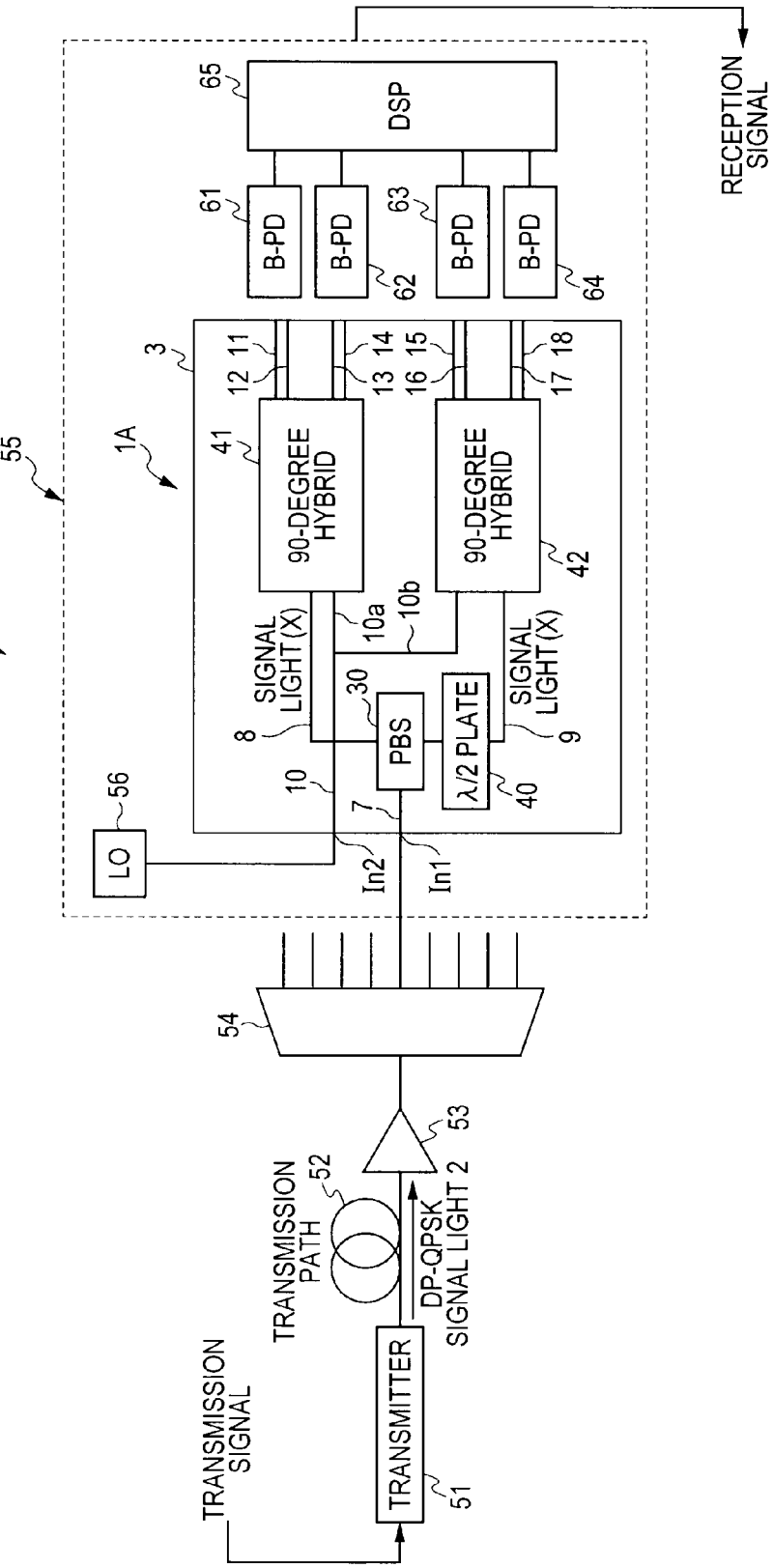
FIG. 20 is a block diagram showing an outline configuration of an optical transmission system using a PLC-type DP-QPSK demodulator according to an embodiment of the present invention.

Next, an embodiment of an optical transmission system 50 using the PLC-type DP-QPSK demodulator explained in each of the embodiments is explained based on FIG. 20.

In the optical transmission system 50, as an example, the PLC-type DP-QPSK demodulator 1A according to the third embodiment shown in FIG. 6 is used. The optical transmission system 50 shown in FIG. 20 comprises a transmitter 51 that phase-modulates a transmission signal and outputs a DP-QPSK signal, an optical transmission path 52 configured by an optical fiber, an erbium-doped fiber amplifier (EDFA) 53, an AWG 54, and a receiver 55.

The transmitter 51 outputs the DP-QPSK signal 2 formed by wave-multiplexing the X-polarization QPSK signal and the Y-polarization QPSK signal, which are quadrature phase shift keyed X-polarization light and Y-polarization light of a plurality of wavelengths ($\lambda_1$ to $\lambda_n$). That is, from the transmitter 51 to the optical transmission path 52, a DP-QPSK signal corresponding to n waves of the multiplexed DP-QPSK signal 2 of a plurality of wavelengths is output.

The receiver 55 comprises an LO light source 56 that outputs X-polarization LO light, the PLC-type DP-QPSK demodulator 1A, four balanced photodiodes (B-PD), that is, the balanced photodiodes 61 and 62 and balanced photodiodes 63 and 64, each having a pair of photodiodes, and a digital signal processing circuit (DSP) 65.

The P-PDs 61, 63 are each an optical detector for the I channel and the B-PDs 62, 64 are each an optical detector for the Q channel. The digital signal processing circuit 65 comprises a clock extraction circuit that reproduces a clock having the same rate as and in synchronization with a demodulated signal obtained by demodulating each of X-polarization and Y-polarization QPSK signals, a sampling circuit for the I channel and the Q channel that performs sampling with the clock, an A/D converter that converts each sampling signal into a digital signal, etc.

In the optical transmission system 50 having the above configuration, the DP-QPSK signal corresponding to n waves output from the transmitter 51 propagates through the optical transmission path 52 and after amplified in the EDFA 53, enters the AWG 54 and separated by the AWG 54. Among the light of a plurality of wavelengths ($\lambda_1$ to $\lambda_n$) separated by the AWG 54, for example, the DP-QPSK signal of a wavelength $\lambda_i$ is input to the input port In1 of the demodulator 1A.

The DP-QPSK signal 2 of the wavelength $\lambda_i$ input from the input port In1 is polarization-split into the X-polarization QPSK signal (X-signal) and the Y-polarization QPSK signal (Y-signal) by the PBS 30. Because the half-wavelength plate 40 is inserted into the optical waveguide 9 through which the Y-signal polarization-split in the PBS 30 propagates, both the X-signal and the Y-signal are caused to enter each of the 90-degree hybrid circuits 41, 42 in X polarization.

In the 90-degree hybrid circuit 41, the X-polarization LO light and the X-signal are mixed and split into the I-, Q-channel components of the X-signal. From the 90-degree hybrid circuit 41 to the B-PD 61, the signal light of the I-channel component in the X-signal is output and from the 90-degree hybrid circuit 41 to the B-PD 62, the signal light of the Q-channel component in the X-signal is output, respectively.

On the other hand, in the 90-degree hybrid circuit 42, the X-polarization LO light and the Y-signal converted into X polarization are mixed and split into the I-, Q-channel components of the Y-signal. From the 90-degree hybrid circuit to the B-PD 63, the signal light of the I-channel component in the Y-signal is output and from the 90-degree hybrid circuit 42 to the B-PD 64, the signal light of the Q-channel component in the Y-signal is output, respectively.

From the B-PD 61 to the DSP 65, a signal of a current value in accordance with the intensity difference of the signal light of the I-channel component in the X-signal (two kinds of signal light in opposite phases) (balance-received I-channel demodulated signal) is output. From the B-PD 62 to the DSP 65, a signal of a current value in accordance with the intensity difference of the signal light of the Q-channel component in the X-signal (two kinds of signal light in opposite phases) (balance-received Q-channel demodulated signal) is output.

From the B-PD 63 to the DSP 65, a signal of a current value in accordance with the intensity difference of the signal light of the I-channel component in the Y-signal (two kinds of signal light in opposite phases) (balance-received I-channel demodulated signal) is output. Then, from the B-PD 64 to the DSP 65, a signal of a current value in accordance with the intensity difference of the signal light of the Q-channel component in the Y-signal (two kinds of signal light in opposite phases) (balance-received Q-channel demodulated signal) is output.

The DSP 65 reproduces a clock having the same rate as and in synchronization with a demodulated signal output from the B-PDs 61 to 64, respectively, by the clock extraction circuit and the sampling circuit for the I channel and Q channel samples the demodulated signal with the clock and generates a sampling signal. Each sampling signal is converted into a digital signal by the A/D converter and a reception signal is output from the DSP 65.

According to the optical transmission system having the above configuration, the following technical advantages are obtained.

(1) Because the demodulator 1A in which the PBS 30 and the two 90-degree hybrid circuits 41, 42 are integrated within the PLC chip 3 is used, alignment work and bonding work for the optical connection of the PBS and the two 90-degree hybrid circuits are no longer necessary. As a result of that, it is possible to manufacture the optical transmission system 50 without connection loss between the PBS and the two 90-degree hybrid circuits at a low cost.

(2) The demodulator 1A is used, which is designed so that the effective optical path lengths of the paths from the PBS 30 to the output port are the same in the paths of the signal light that enters the 90-degree hybrid circuits 41, 42, respectively. Because of this, it is possible to realize a high-performance optical transmission system that reduces the skew between the X-signal light and the Y-signal light in the same X polarization.

For example, it is made possible to reduce the skew between the signal light in the same X polarization to 5 ps or less in a DP-QPSK modulation system optical transmission system with a symbol rate of 25 GSymbol/s and a bit rate of 100 Gbit/s.

(3) It is possible to realize an optical transmission system particularly effective in optical fiber communication of the dense wavelength division multiplexing (DWDM) transmission system.

(4) The current value of the signal (demodulated signal) output from each of the B-PDs to 64 is in proportion to the product of the amplitude of the DP-QPSK signal and the amplitude of the LO light. Because of this, if the power of the LO light output from the LO light source 56 is increased, the signal current from each of the B-PDs 61 to 64 increases in proportion to the square root of the power. Because of this, it is possible to realize a high-performance optical transmission system. Such advantages can be obtained by the optical transmission system using the demodulator of the coherent optical transmission system in which signal light and LO light are mixed.

The present invention can be modified and embodied as follows.

In the demodulator explained in each of the embodiments, a set of the reception circuits including at least one PBS, two 90-degree hybrid circuits, and an optical waveguide that connects them is formed on the PLC 3, however, the present invention can also be applied to a PLC-type DP-QPSK demodulator in which a plurality of sets of reception circuits is formed on the PLC 3. In the PLC-type DP-QPSK demodulator configured as described above, one optimum reception circuit can be selected from among the plurality of sets of reception circuits, and therefore, yields are improved and it is possible to make an attempt to further reduce the cost.

In the demodulator 1D explained in each of the embodiments, which is the demodulator explained in FIG. 9, it may also be possible to fold twice at least one of the folded waveguides 43, 44, 45, 46, 47 to return it to the original direction.

In the explanation described above, description is given on the assumption that demodulation of the DP-QPSK modulated signal is performed mainly among the polarization multiplexing coherent modulation systems, however, the application of the demodulator of the present invention is not limited to the DP-QPSK modulation system and the demodulator can also be applied to other coherent modulation systems, such as QAM (Quadrature Amplification Modulation) and OFDM (Orthogonal Frequency Division Multiplexing).

The invention claimed is:

1. A Planar Lightwave Circuit (PLC)-type demodulator that receives and demodulates a polarization-multiplexed coherent modulated signal, the demodulator comprising:
   one PLC chip in which a planar lightwave circuit is formed;
   a first input port provided at an input end of the PLC chip and inputting the polarization-multiplexed coherent modulated signal into the planar lightwave circuit;
   a second input port provided at the input end of the PLC chip and inputting local oscillation light into the planar lightwave circuit;
   at least one polarization beam splitter that splits the polarization-multiplexed coherent modulated signal input from the first input port into an X-polarization coherent modulated signal and a Y-polarization coherent modulated signal;
   a first 90-degree hybrid circuit that mixes and outputs the X-polarization coherent modulated signal and the local oscillation light input from the second input port;
   a second 90-degree hybrid circuit that mixes and outputs the Y-polarization coherent modulated signal and the local oscillation light input from the second input port;
   a second polarization beam splitter that splits the mixed light of the X-polarization local oscillation light and the Y-polarization local oscillation light into the X-polarization local oscillation light and the Y-polarization local oscillation light;
   a waveguide that connects the first input port and an input side coupler of the polarization beam splitter and has a bent region to fold propagating light;
   a waveguide that connects the second input port and the input side coupler of the second polarization beam splitter and has a bent region to fold propagating light;
   a first waveguide that connects an output side coupler of the polarization beam splitter and the first 90-degree hybrid circuit, transmits one of the X-polarization coherent modulated signal and the Y-polarization coherent modulated signal, and has a bent region to fold propagating light;
   a second waveguide that connects the output side coupler of the polarization beam splitter and the second 90-degree hybrid circuit, transmits the other of the X-polarization coherent modulated signal and the Y-polarization coherent modulated signal, and has a bent region to fold propagating light;
   a third waveguide that connects the output side coupler of the second polarization beam splitter and the first 90-degree hybrid circuit, transmits one of the X-polarization local oscillation light and the Y-polarization local oscillation light, and has a bent region to fold propagating light; and a fourth waveguide that connects the output side coupler of the second polarization beam splitter and the second 90-degree hybrid circuit, transmits the other of the X-polarization local oscillation light and the Y-polarization local oscillation light, and has a bent region to fold propagating light, wherein the at least one polarization beam splitter, the first 90-degree hybrid circuit, and the second 90-degree hybrid circuit are integrated within the planar lightwave circuit, the polarization beam splitter and the second polarization beam splitter each has the input side coupler and the output side coupler, the polarization beam splitter and the second polarization beam splitter are provided so that the input side coupler is located on the output end side of the PLC chip opposite to the input end and the output side coupler is located on the input end side the first 90-degree hybrid circuit, the polarization beam splitter, the second polarization beam splitter, and the second 90-degree hybrid circuit are arranged in a direction perpendicular to the direction extending from the input end toward the output end, the optical path length of the first waveguide and the optical path length of the second waveguide are the same, the optical path lengths of the first waveguide, the second waveguide, the third waveguide, and the fourth waveguide are the same, the second waveguide and the third waveguide intersect with each other at an intersection angle 2θ, the first waveguide has a first bend waveguide connected to the output side coupler of the polarization beam splitter, a first straight waveguide connected to the first bend waveguide, and a second bend waveguide connected to the first straight waveguide, the second waveguide has a third bend waveguide connected to the output side coupler of the polarization beam splitter, a second straight waveguide connected to the third bend waveguide, and a fourth bend waveguide connected to the second straight waveguide, the third waveguide has a fifth bend waveguide connected to the output side coupler of the second polarization beam splitter, a third straight waveguide connected to the fifth bend waveguide, and a sixth bend waveguide connected to the third straight waveguide, the fourth waveguide has a seventh bend waveguide connected to the output side coupler of the second polarization beam splitter, a fourth straight waveguide connected to the seventh bend waveguide, and an eighth bend waveguide connected to the fourth straight waveguide, the first, third, fifth and seventh bend waveguides have the same shape as a fan-shaped arc with a bend radius r and a central angle θ, the second, fourth, sixth and eighth bend waveguides have the same shape as a fan-shaped arc with the bend radius r and a central angle greater than $\pi-2\theta$ ($0<\theta<\pi/2$), a length l of the first, second, third and fourth straight waveguides satisfies a relationship $l=(2r\cos\theta-r-p/2)/\sin\theta$ when an interval between two waveguides in the proximity of the output side coupler is p, and the second waveguide and the third waveguide intersect with each other at a boundary between the second straight waveguide and the fourth bend waveguide and at a boundary between the third straight waveguide and the fifth bend waveguide.

2. The PLC-type demodulator according to claim 1, wherein a path through which the X-polarization coherent modulated signal propagates and a path through which the Y-polarization coherent modulated signal propagates are set so that all of the effective optical path lengths from the input end toward the output end of the PLC chip are the same.

3. The PLC-type demodulator according to claim 1, wherein the number of the polarization beam splitters is two or more, and the polarization beam splitters and the first and second 90-degree hybrid circuits are arranged, in a proximity of each other.

4. The PLC-type demodulator according to claim 3, wherein the polarization beam splitters are cascade-connected in two or more stages.

5. The PLC-type demodulator according to claim 1, wherein the PLC chip is rectangular, substantially close to square, in shape, a polarization beam splitter in a first stage is formed at the central part of the rectangular PLC chip and a second and a third polarization beam splitters in a second stage are formed in parallel, sandwiching the polarization beam splitter in the first stage in between, and one of the first and second 90-degree hybrid circuits is formed on the opposite side of the polarization beam splitter in the first stage with respect to the second polarization beam splitter and the other of the first and second 90-degree hybrid circuits is formed on the opposite side of the polarization beam splitter in the first stage with respect to the third polarization beam splitter.

6. The PLC-type demodulator according to claim 5, wherein an output end of the polarization beam splitter in the first stage and an input end of the second polarization beam splitter are connected from the output end toward the input end, using bend waveguides with the absolute value of the total of the rotation angles, the sign of which is not reversed being greater than 180 degrees, as a folded waveguide, and the output end of the polarization beam splitter in the first stage and an input end of the third polarization beam splitter are connected from the output end toward the input end, using bend waveguides with the absolute value of the total of the rotation angles, the sign of which is not reversed being greater than 180 degrees, as a folded waveguide.

7. The PLC-type demodulator according to claim 5, wherein an output end of the second polarization beam splitter and an input end of one of the first and second 90-degree hybrid circuits are connected from the output end toward the input end, using bend waveguides with the absolute value of the total of the rotation angles, the sign of which is not reversed being greater than 180 degrees, as a first folded waveguide, and an output end of the third polarization beam splitter and an input end of the other of the first and second 90-degree hybrid circuits are connected from the output end toward the input end, using bend waveguides with the absolute value of the total of the rotation angles, the sign of which is not reversed being greater than 180 degrees, as a second folded waveguide.

8. The PLC-type demodulator according to claim 7, wherein
   each of the polarization beam splitter, the second polarization beam splitter, and the third polarization beam splitter is a Mach-Zehnder interferometer including an input side coupler as an input end of the polarization beam splitter, an output side coupler as an output end of the polarization beam splitter, and two arm waveguides connected between both the couplers,
   a cross port of the output side coupler of the second polarization beam splitter and an input side coupler of one of the first and second 90-degree hybrid circuits are connected by the first folded waveguide, and
   a cross port of the output side coupler of the third polarization beam splitter and an input side coupler of the other of the first and second 90-degree hybrid circuits are connected by the second folded waveguide.

9. The PLC-type demodulator according to claim 5, further comprising:
   two inspection input ports for inputting light caused to pass through only the second and third polarization beam splitters; and
   two inspection output ports for outputting light having passed through the second and third polarization beam splitters, respectively, wherein
   a heater is provided on at least one of the two arm waveguides of the polarization beam splitter in the first stage.

10. The PLC-type demodulator according to claim 1, wherein
    the polarization beam splitter is a Mach-Zehnder interferometer including an input side coupler as an input end of the polarization beam splitter, an output side coupler as an output end of the polarization beam splitter, and two arm waveguides connected between both the couplers.

11. The PLC-type demodulator according to claim 1, wherein
    the second input port has an input port of X-polarization local oscillation light having the same polarized wave and the same wavelength as the X-polarization coherent modulated signal and an input port of Y-polarization local oscillation light having the same polarized wave and the same wavelength as the Y-polarization coherent modulated signal.

12. The PLC-type demodulator according to claim 1, further comprising:
    a first path through which the X-polarization coherent modulated signal, split in the polarization beam splitter, propagates and which connects the polarization beam splitter and the first 90-degree hybrid circuit;
    a second path through which the Y-polarization coherent modulated signal, split in the polarization beam splitter, propagates and which connects the polarization beam splitter and the second 90-degree hybrid circuit; and
    a half-wavelength plate inserted into the first path or the second path, wherein
    the PLC-type demodulator is configured so that signals enter the first and second 90-degree hybrid circuits, respectively, in the same polarization state.

13. The PLC-type demodulator according to claim 12, wherein
    the number of the second input ports is one, and
    the PLC-type demodulator further comprises:
    a path which is configured to split X-polarization or Y-polarization local oscillation light input from the second input port within the planar lightwave circuit and input it to the first and second 90-degree hybrid circuits, respectively.

14. An optical transmission system comprising:
    a transmitter that modulates a lightwave and outputs a polarization-multiplexed light signal;
    an optical transmission path that transmits the polarization-multiplexed light signal output from the transmitter; and
    a receiver that performs coherent reception of the polarization-multiplexed light signal transmitted through the transmission path, wherein
    the receiver includes:
    a light source that outputs local oscillation light;
    a Planar Lightwave Circuit (PLC)-type demodulator according to claim 3;
    an optical detector for X-polarization I channel and Q channel;
    an optical detector for Y-polarization I channel and Q channel; and
    a digital signal processing circuit.

15. The optical transmission system according to claim 14, wherein
    a method of the modulation is quadrature phase shift keying.

* * * * *

UNITED STATES PATENT AND TRADEMARK OFFICE
CERTIFICATE OF CORRECTION

PATENT NO. : 8,526,102 B2
APPLICATION NO. : 13/409343
DATED : September 3, 2013
INVENTOR(S) : Takashi Inoue et al.

It is certified that error appears in the above-identified patent and that said Letters Patent is hereby corrected as shown below:

On the title page, Item (73), the Assignee's Information is incorrect. Item (73) should read:

--(73)   Assignee:   Furukawa Electric Co., Ltd., Tokyo (JP)--

Signed and Sealed this
Fifth Day of November, 2013

Teresa Stanek Rea
*Deputy Director of the United States Patent and Trademark Office*